(12) United States Patent
Dagdelen Uysal et al.

(10) Patent No.: US 10,474,854 B2
(45) Date of Patent: Nov. 12, 2019

(54) METHOD AND APPARATUS FOR TRACKING ONE OR MORE PLANTS AND/OR PLANT BASED PRODUCTS AND/OR TRACKING THE SALE OF PRODUCTS DERIVED FROM THE SAME, UTILIZING RFID TECHNOLOGY

(71) Applicant: METRC LLC, Lakeland, FL (US)

(72) Inventors: Dilek Dagdelen Uysal, Lakeland, FL (US); Jeffrey Lane Wells, Lakeland, FL (US)

(73) Assignee: METRC LLC, Lakeland, FL (US)

( * ) Notice: Subject to any disclaimer, the term of this patent is extended or adjusted under 35 U.S.C. 154(b) by 0 days.

(21) Appl. No.: 15/655,285

(22) Filed: Jul. 20, 2017

(65) Prior Publication Data

US 2017/0316237 A1 Nov. 2, 2017

Related U.S. Application Data

(62) Division of application No. 14/764,904, filed as application No. PCT/US2015/035644 on Jun. 12, 2015, now Pat. No. 9,959,438.

(60) Provisional application No. 62/011,463, filed on Jun. 12, 2014.

(51) Int. Cl.
*G06K 7/10* (2006.01)
*G06Q 10/08* (2012.01)
*G06Q 50/02* (2012.01)
*G06Q 50/28* (2012.01)
*G06K 19/07* (2006.01)

(52) U.S. Cl.
CPC ..... *G06K 7/10366* (2013.01); *G06K 19/0723* (2013.01); *G06Q 10/087* (2013.01); *G06Q 10/0833* (2013.01); *G06Q 50/02* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 3,072,986 A | 1/1963 | Lefnaer | |
| 6,856,966 B1 | 2/2005 | Fujimoto | |
| 6,991,175 B1 | 1/2006 | Huang | |
| 8,674,810 B2 | 3/2014 | Uysal | |
| 2005/0108912 A1 | 5/2005 | Bekker | |
| 2005/0178058 A1* | 8/2005 | Rudolph | A61K 36/00 47/60 |

(Continued)

FOREIGN PATENT DOCUMENTS

WO WO 2009/039419 3/2009

*Primary Examiner* — Kristy A Haupt
(74) *Attorney, Agent, or Firm* — Saliwanchik, Lloyd & Eisenschenk

(57) ABSTRACT

This invention is for tracking at least one plant. A method of this invention comprises: putting at least one seed or at least one stem in a corresponding at least one pot; positioning a corresponding at least one RFID tag with respect to the seed or stem in a manner, wherein the RFID tag comprises a strap; packaging a harvested material into a packaged product and attaching the RFID tag from the potted plant, or a product RFID tag that is associated with the plurality of tags to the packaged product; confirming a request for authorization by a RFID buy card; and after confirming ID information, transferring at least one product.

35 Claims, 6 Drawing Sheets

(56) References Cited

U.S. PATENT DOCUMENTS

| | | |
|---|---|---|
| 2009/0231101 A1 | 9/2009 | Hyde et al. |
| 2011/0225777 A1 | 9/2011 | Arjomand |
| 2011/0264559 A1 | 10/2011 | Barrientos et al. |
| 2012/0199651 A1 | 8/2012 | Glazer |
| 2014/0053462 A1* | 2/2014 | Wei .......................... A01H 1/02 47/58.1 R |
| 2015/0278757 A1* | 10/2015 | Walden ................ C07D 311/80 235/376 |

* cited by examiner

METHOD AND APPARATUS FOR TRACKING ONE OR MORE PLANTS AND/OR PLANT BASED PRODUCTS AND/OR TRACKING THE SALE OF PRODUCTS DERIVED FROM THE SAME, UTILIZING RFID TECHNOLOGY

CROSS-REFERENCE TO RELATED APPLICATION

The present application is a divisional application of co-pending U.S. patent application Ser. No. 14/764,904, filed Jul. 30, 2015; which is the National Stage Application of International Application Number PCT/US2015/035644, filed Jun. 12, 2015; which claims the benefit of U.S. Provisional Application Ser. No. 62/011,463, filed Jun. 12, 2014, all of which are hereby incorporated by reference in their entirety, including any figures, tables, or drawings.

BACKGROUND OF INVENTION

The tracking of high value products and/or products for which control and/or documenting of the location and/or possession of, such as controlled substances, can be expensive. With respect to medical and/or retail marijuana, under current laws and regulations, it can be important to track the final product, and it can also be important to track the plant from planting as a seed or potting as a stem, due to the regulatory laws that involve growing marijuana.

Marijuana plants can be grown from seeds. However, marijuana plants are typically grown from stems rather than seeds. A seed, or a stem taken from a marijuana plant, can be potted, in soil or in water (hydroponic system) in order to prompt the stem to produce roots. As the potted clone grows further, the clone transfers into a vegetative stage. At this stage, the potted plant, or potted clone, is then typically moved to another location repotted. This repotting can occur before, during, or after transportation to the new location, and each clone is typically potted into a bigger pot. After a period of time of further growth, typically 6-7 weeks, the flowering stage begins. At this time, the plants may again be moved to another location. When the plants have matured further, they are harvested. Harvesting typically occurs when the plants reach maximum potential for budding. The harvested materials from multiple plants are then typically gathered and a lot or batch of the harvested material, or product, is created, which will be dried and cured together. The dried and cured product is packaged to be sold.

In certain jurisdictions, people are allowed to purchase marijuana only after receiving authorization for such purchase, and/or are only allowed to purchase marijuana in limited quantities and/or within limited or prescribed time periods. Further, a grower and/or supplier may be allowed to grow and/or supply a limited quantity, such as a limited: number of marijuana plants, volume of marijuana, weight of marijuana, retail value of marijuana, and/or other metric with respect to the marijuana being grown and/or supplied. The grower may have an associated license number, or other identifying information. As an example, in Colorado, the retail sale of marijuana is currently limited to ¼ oz per day per person for non-residents.

RFID (Radio Frequency Identification) technology is an identification technology that is commonly used to identify, track, and/or trace goods, in order to provide security, manage inventory, facilitate a sale or exchange, and/or improve supply chain efficiencies. Such tracking by the RFID system can be automated, such that, for example, the RFID tag is automatically read when positioned in a certain geographic location or is attached to an object that is moved. Radio frequency identification (RFID) technology enables automatic identification of unique items by using radio frequency (RF) signals. A typical RFID system includes a tag, a reader, an antenna, and a host system. The reader gathers information about an object by communicating through the antenna with the tag attached to the object. The host system then processes the data collected by the reader to obtain information related to the tagged object.

There are generally three different types of Radio Frequency Identification (RFID) tags: passive RFID tags, semi-passive RFID tags, and active RFID tags. Passive RFID tags do not contain an on-tag power source. Passive tags harvest all of the tag's operational energy from the RFID reader's communication signal and use this harvested power to send back a signal with the information on the tag. Semi-passive RFID tags, which are also called battery assisted (BAP) tags have an on-tag power source, and also use energy harvested from the reader's communication signal. Active RFID tags have an on-tag power source, and use this on-tag power source to actively generate and transmit an electromagnetic signal in response to receipt of the RFID reader's signal and perform other functions.

Battery-less tags, by virtue of their potentially ultra-low cost and essentially unlimited shelf life, are important components for a broad class of important RFID applications. When an RFID inventory-tracking scheme requires every case or item within the purview of an inventory-control system to be tagged, which is the typical case for retail-distribution applications battery-less tags are generally preferred. When long-term storage of tagged items is involved, such as in a physical records archive managed with RFID technology, the finite shelf-life of batteries is an additional strong motivator for the use of battery-less tags.

Poor performance for RFID systems are still frequently experienced when tags are on or near items that contain or comprise materials that interact strongly with RF propagation. Such materials include metal, dielectrics and lossy dielectrics that reflect, refract or attenuate RF energy incident on them or passing through them. Cans, foils, liquids, gels, dense powders, produce, meat and dairy products are just a few examples among numerous items that can severely impair the RF coupling between a reader and a tag.

Severe attenuation of a signal propagating from an RFID reader to a battery-less RFID tag is particularly problematic. The RF electromagnetic field strength required to operate a battery-less RFID tag is significantly higher than that required to communicate to an electronic receiver having an independent power supply such as a battery. Active electronic circuitry, powered by a battery or other power source, can indeed detect, decode and otherwise process extremely weak signals. A battery-less RFID tag, however, cannot operate such electronic circuitry until the tag has extracted sufficient energy from the RF electromagnetic field supplied by the reader or another external source. The incident RF field level required to provide operating power for the electronic circuitry is far greater than that required to communicate with already-powered circuits. The frequent difficulty in achieving the necessary incident RF field strength in the presence of material configurations with adverse RF propagation characteristics, while still satisfying regulatory constraints on radiated RF power levels, is an important issue.

Except providing longer read ranges by powering up the RF chip without any signal from the interrogator in the case of active tags, the battery in the tags are commonly used to power up the circuitry of the tags that has additional features and components such as an extended memory, a real time clock, and/or one or more sensors.

BRIEF SUMMARY

Embodiments of the invention relate to a method and system for tracking one or more plants, plant based raw material, and/or plant based products. Specific embodiments can utilize RFID tags and one or more RFID readers to track one or more plants, plant based raw material, and/or plant based products. Specific plant based products can include infused. Specific embodiments relate to an RFID tag that incorporates a strap or other structure to position an RFID label relative to a plant and/or plant based raw materials. Further embodiments relate to a method and system for tracking the sale and/or distribution of a product, such as a plant based product. Further specific embodiments relate to a method and system utilizing RFID buy cards and to tracking the sale and/or distribution of a product, such as marijuana. Further specific embodiments relate to a system utilizing a plurality of RFID tags and RFID buy cards can track one or more plants from a desired point in the plant's life cycle to the sale and/or distribution of a product from the one or more plants.

In a specific embodiment, each plant potted by a grower can be tagged with an RFID tag at a desired point in the plant's life cycle, such as at the time of original potting. The plant can then be monitored during the growth of the plant, and through the harvesting of the plant, in order to track how much product, such as marijuana, is produced. In further embodiments, RFID buy cards can be utilized to control and/or record transactions involving sale and/or distribution of the harvested marijuana, to control and/or record one or more of the following metrics relating to a sale and/or transfer of a product: the date window of the transaction, the date of the transaction, the time of the transaction, the buyer, the seller, the transferee, the transferer, and the amount of product sold and/or transferred. Embodiments where the purchaser and the seller are recorded can allow the system to match the inventory of the grower and the purchaser.

Embodiments can use an RFID tag system to tag the plants and an RFID purchasing card system, utilizing RFID buy cards, for individuals, to record the transactions or control the date and/or time and/or amount a purchaser can purchase and/or a seller can seller and/or distribute. Tagging marijuana plants or any other plants with devices incorporating RFID tags can allow the plant to be tracked throughout the life cycle of the plant. Embodiments can utilize a tag design and method that allow the radio waves, i.e., RF electromagnetic radiation, that carry the signal to communicate between the reader and the tag in the environment in which the plant is located, such as in an environment having many plants closely positioned with respect to each other.

Embodiments of the invention relate to a method and system utilizing an RFID tag that can be utilized in this manner, as well as to an RFID tag that can be used in this manner. Specific embodiments relate to an RFID tag that can be utilized at different stages of the plant's life cycle and/or the product cycle.

DETAILED DISCLOSURE

Figure 1:
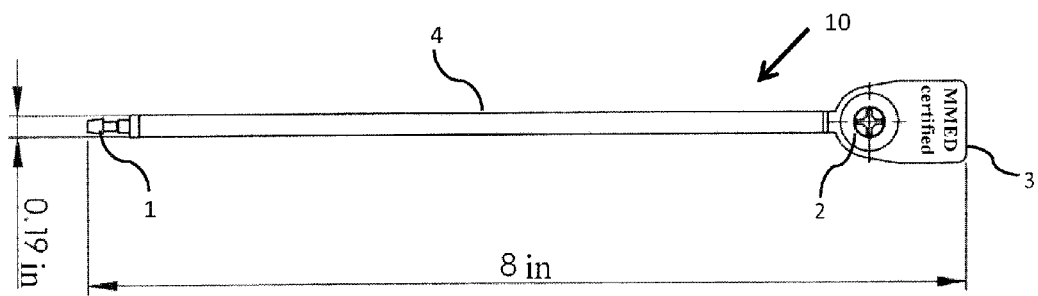
FIG. 1 shows a front view of a strap that can be utilized in accordance with an embodiment of the invention.

Embodiments of the invention relate to a method and system for tracking one or more plants and/or plant based raw material. Specific embodiments can utilize RFID tags and one or more RFID readers to track one or more plants and/or plant based raw material. Specific embodiments relate to an RFID tag that incorporates a strap or other structure to position an RFID label relative to a plant and/or plant based raw materials. Further embodiments relate to a method and system for tracking the sale and/or distribution of a product, such as a plant based product. Further specific embodiments relate to a method and system utilizing RFID buy cards and to tracking the sale and/or distribution of a product, such as marijuana. Further specific embodiments relate to a system utilizing a plurality of RFID tags and RFID buy cards can track one or more plants from a desired point in the plant's life cycle to the sale and/or distribution of a product from the one or more plants.

Marijuana plants can be grown from seeds. However, marijuana plants are typically grown from stems rather than seeds. A seed, or a stem taken from a marijuana plant, can be potted, in soil or in water (hydroponic system) in order to prompt the stem to produce roots. When a seed is planted, a sprout from the seed sprouts, or a stem is first plotted into a small pot, an RFID tag that will provide at least couple of feet read distance can be difficult to attach on to the stem and may cause difficulties if so attached. It is preferable not to attach the RFID tag to the small pot in which the seed, sprout, or stem is potted in, as the water and soil content of the small pot will typically affect the read performance of the tag and may even prevent the tag from being read. Further, even if the tag is attached to an empty portion of the small pot for the readability, it is not guaranteed that the same small pot is kept with the plant when it is transferred and/or repotted, such as to a bigger pot. Moreover, it is preferred to attach the RFID tag onto the plant itself when the clones are proven that they are viable and reach vegetative stage.

Embodiments of the invention position an RFID tag with respect to a seed or stem (clone), such as after potting the seed or stem in a pot with soil or water, in a manner that the RFID tags is associated with the seed or stem. The RFID tag can be positioned with respect to the seed or stem by attaching the RFID tag to the pot of each seed or stem, inserting the RFID tag into the soil or water in which the seed or stem is potted and standing the tag up, or laying the RFID tag on the soil or pot, upon initial potting, or at a later time in the plant life cycle, such as upon repotting.

As the potted seed or stem (clone) grows further, the seed sprouts or the stem (clone) that is matured transfers into a vegetative stage. At this stage, the potted plant is then typically moved to another location and repotted. This repotting can occur before, during, or after transportation to the new location, and each plant is typically potted into a bigger pot. If already tagged when a sprout came up from seed or when the stem was originally potted, the RFID tag can be moved along with the plant. If not already tagged, the plant can be tagged at this time.

After a period of time of further growth, typically 6-7 weeks, the flowering stage begins. At this time, the plant may again be moved to another location. Again, if already tagged, the RFID tag can remain with the plant. If not already tagged, the plant can be tagged at this time. When the plant has matured further, it is harvested. Multiple seeds or stems can be potted at the same time, and subsequently moved and repotted at the same time. Harvesting typically occurs when the plants reach maximum potential for budding. The harvested materials from multiple plants are then typically gathered and a lot or batch of the harvested material, or product, is created, which will be dried and cured together. At this stage, the RFID tags of the plants can be collected and kept with the harvested material, or product, until the dried and cured product is packaged to be sold. Based on the size of the packaged product, one or more of the tags is attached to the product or a different tag that is traceable (associated with) to the original tag is created and attached to the packaged product.

Embodiments of the invention can utilize a strap 10 and an RFID label 20 to form an RFID tag 30, wherein the strap can be used for attachment to the plant, the plant's pot, and/or other structures and the RFID label can be read by the RFID reader. Specific embodiments use a printed RFID label that is waterproof, and has chemical and UV resistance. In an embodiment, the RFID tag 30 is configured such that the RFID tag 30 can be inserted into the small pot, such as inserted into the soil in the small pot, or placed in the water the stem is potted in. In a further embodiment, the RFID tag can incorporate a built in clip or other attachment mechanism for clipping or otherwise engaging the small pot, or a separate clip can be used. In various embodiments, the pot and RFID tag can be configured such that the RFID tag interconnects with the pot in either a releasable manner, or in a manner that requires a special tool to separate the RFID tag from the pot, in a manner that requires separating a portion of the RFID tag (e.g., having the RFID label from a portion of the RFID tag interconnected with the pot), or requires separating a portion of the pot to which the RFID tag is interconnected from the remaining portion of the pot.

Figure 3:
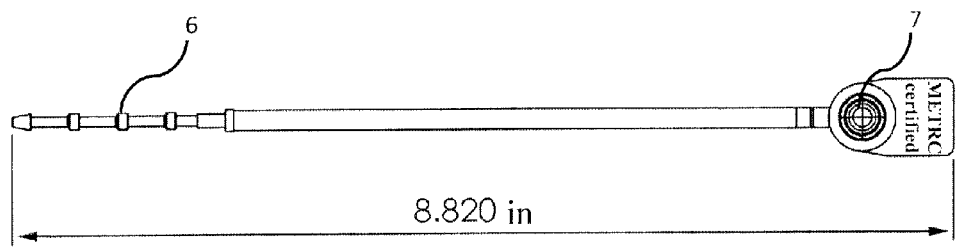
FIG. 3 shows a front view of a strap with multiple locking positions for re-using the strap in different stages of the plant

In specific embodiments, data stored on the RFID tag can be updated to reflect the RFID tag has been disconnected from the pot, and if desired, updated to reflect the plant has been repotted. The RFID tag can also be configured such that, at least in one configuration, the tag can be placed on top of the soil (e.g., around the sprout or stem), or wrapped around a portion of the small pot, when the plant is small and can be removed from the small pot and attached to the plant once the plant is bigger and viable (e.g., upon repotting). The RFID tag is preferably attached to one of the main branches when the plant is big enough to carry the weight of the RFID tag. In an embodiment a reusable strap can be used if the regulatory agency allows the grower to remove the tag and re-attach it to another branch. When the plant grows, the branches at the bottom are usually trimmed for it to grow better. If the RFID tag is attached to a branch that needs to be trimmed, the same RFID label needs to be re-attached to another location. The embodiment can have a strap design that has a releasable lock or have a limited number of locking positions that allow the grower to re-use the same strap. FIG. 1 illustrates a front view of a strap 10 that can be incorporated in an RFID tag 30 in accordance with an embodiment of the invention. The embodiment of the strap 10 in FIG. 1 has a tooth 1 and a passage 2, where the tooth 1 can be inserted into the passage 2 to create a tamper proof locking position, which, once in the locking position, prevents the tooth 1 from being removed from passage 2 and the strap or RFID tag incorporating the strap from being reused. In another embodiment, there can be several locking steps as in FIG. 3, such as teeth or knots 6, and once a step is latched into the lock 7, the strap cannot be opened again without damaging the strap. In this design the user needs to cut the knot to release the lock and re-use the strap based on the number of knots. This type of nonreleasable strap designs can improve security along with the security of the RFID label with its unique EPC number, as in order to separate the RFID tag from the plant it is often necessary to break or damage the strap or damage the plant. It allows the regulatory agency to track the number of straps that have been ordered and the number of plants that have been grown. In alternative embodiments, a strap having a releasable locking mechanism, such as a tooth and a passage having a release mechanism, which allows release of the tooth from the passage after the tooth is locked in the passage, can be used. In further embodiments, the strap can be such that a special tool is required to decouple the ends of the strap once coupled, such as releasing tooth 1 from passage 2, in order to allow release without damage and then allow reuse of the strap. Specific embodiments can have two passages 2, where one passage 2 is releasable and the second is nonreleasable, or a single passage 2 where pushing the tooth to a first position creates a releasable coupling and pushing the tooth 1 to a second position creates a locked position. In a specific embodiment, a washer or other structure can be placed on tooth 1 and 6 to prevent the user from pushing the tooth to the second position until the washer is removed. In a specific embodiment latch 7 can have an open end where a tooth 6 can pass through completely.

The strap may also have, but need not have, a flap 3 that information can be printed or written and displayed, such as a logo, a serial number, or other information for visual authentication. In specific embodiments, information can be written on the elongated body 4, or other portion, of the strap. The strap shown in FIG. 1 has such a flap 3.

Figure 2:
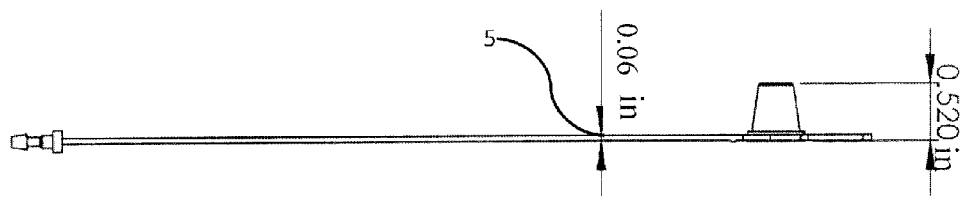
FIG. 2 shows a side view of a strap of FIG. 1.

FIG. 2 shows a side view of the strap 10 of FIG. 1. The thickness of the strap 5, as shown in FIG. 2, is such that when the strap has an RFID label 20 in accordance with an embodiment of the invention interconnected with the strap to form an RFID tag 30, and the RFID tag 30 combination is inserted into a pot, such as into the soil in the pot, or clipped or otherwise attached to the pot, the strap carries the weight of the RFID label and the strap itself, so that the RFID tag will still stand upright. The thickness of the strap shown in FIG. 2 is 0.06" and the length of the strap is 8", while the width of the elongated body of the strap is 0.19", as shown in FIG. 1. In an alternative embodiment, the thickness of the strap in FIG. 2 is 0.050". The thickness can be in the range 0.05"-0.070", with a length in the range 7.5"-8.5" or 7.0"-9.0". The strap 10 of FIG. 1 can be made of polypropylene (PP). The width of the tag at the proximal end with the receiving portion, or passage 2, that receives the inserting portion, or tooth 1, on the distal end is 0.520".

Embodiments of the invention relate to a system that incorporates an RFID label 20 that incorporate a label body that has an RFID inlay. The RFID inlay can have an RFID circuit chip, an RFID antenna, or a combination thereof. In one embodiment, the RFID label has one surface on which information such as, for example, bar codes, text, graphics, or combinations thereof can be printed. In specific embodiments, the RFID label body has one or more of the following layers: a layer with a surface for printing on, a layer that contains the RFID inlay, a layer that covers the RFID inlay, and an adhesive layer. Any number of layers having various thicknesses can be used for various purposes in embodiments of the subject RFID label.

The RFID label body can also be resistant to environmental conditions. For example, the RFID label body can be made of one or more media that are weather resistant. For some purposes it may be beneficial to utilize a media that is cold resistant or heat resistant. When utilized with plants, as described herein, it can advantageous for the label body media to be at least resistant to water and UV. Resistance to chemicals, fertilizers, or other substances often used around or on plants can also be helpful.

An RFID printer can be used to label and or encode an RFID label in accordance with embodiments of the invention. An RFID printer that has an encoder therein can be used to write data to the inlay, using radio frequency transmission technology that is directed towards the inlay. Printing information on the RFID label and encoding of the RFID inlay can be done in a single pass of the media through the printer, or can be done by the media being processed through the RFID printer more than once. In one embodiment, RFID labels are separated and passed through a RFID printer individually. In an alternative embodiment, RFID labels are formed as continuous roll of attached RFID labels that are feed continuously through the RFID printer.

Figure 4:
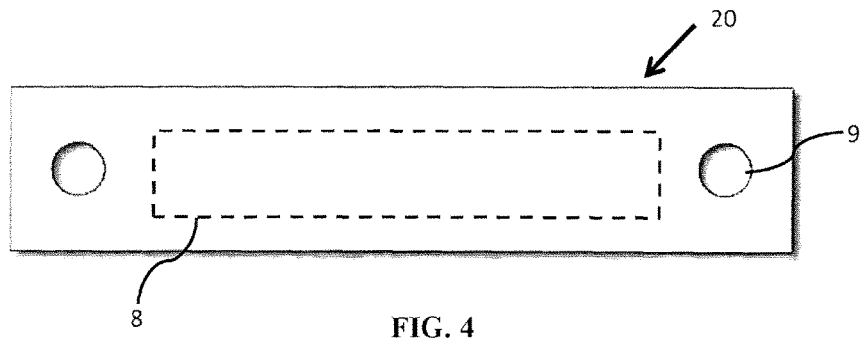
FIG. 4 shows a front view of an RFID label that can be utilized in accordance with an embodiment of the invention.

FIG. 4 shows a RFID label 20 in accordance with an embodiment of the invention, which can be a printed RFID label. The RFID label 20 has an RFID inlay 8, where the RFID inlay 8 can be encapsulated inside a protective material, printed directly to a resistant material and adhered to one side of the label, or otherwise attached to a label body of the RFID label. The RFID label shown in FIG. 4 has 2 openings 9, proximate the ends of the RFID label, which allow the strap to pass through. The sites for the holes 9 can be perforated 12, instead of punctured completely, allowing a user to open the hole when, and if, desired. In specific embodiments, the holes 9 can be located in different locations on the RFID label, such as both on the same end of the RFID label, one or both alongside the RFID inlay 8; there can be a single hole 9 or more than two holes; the hole can have cross-sectional shapes other than circular, and/or have a size as compared to the cross-sectional area of the strap such as a cross-sectional shape that interacts with the cross-sectional shape of the strap so as to prevent rotation of the RFID label with respect to the strap or limit such rotation to a certain angular amount (e.g., 30', 45', 60', 90', or higher); prevents or limits axial travel along the strap once positioned in a desired axial position on the strap. Although holes 9 are incorporated in the embodiment shown in the Figures, other structures can be used. Embodiments can incorporate a mechanism attached to the RFID label that interconnects with a portion of the strap such that the RFID label cannot not be separated from the strap when (i) the ends of the strap are nonreleasably coupled, or locked, together, (or which take a special tool to be separated from each other), or (ii) irrespective of whether the ends of the strap are coupled together.

The label 20 can be thin enough to be printed with a regular RFID printer. The strap can then have a certain rigidness, or stiffness, which allows the RFID tag 30 to stand alone when it is inserted into a small pot.

Along with an RFID inlay 8, the label portion 20 can have a logo, barcodes, such as barcodes for plant identification, and/or other desired information 11. The RFID label 20, as shown in FIG. 5, can also have grower and tag ID for visual identification.

An Electronic Product Code (EPC) is a universal identifier that gives identity to a specific physical object. The use of EPC's in the typical manner enables every product in the world to be distinguished from every other product. An EPC has a data structure (memory) for storing information, such as a header, an EPC manager number, an object class, and a serial number. Embodiments of an RFID tag, or a transponder, can use such memory in the RFID tag to store information other than just the identity of the product (e.g., worldwide product identification). In specific embodiments, the memory of the RFID tag can be used to store information specific to the production of the packaged product, what agency authorized production, and other information. Thus, the transponder can use EPC number or serial number memory space to store and provide information which can be coded as values (e.g., values of the tag), instead of storing a typical EPC or serial number. Information that can be stored in the memory of the RFID tag includes, but is not limited to, a header, an install ID, a tag version, a license no., a serial no., a product ID, the battery life, the memory status, and/or status of the RFID tag, such as whether the RFID tag is running, stopped, or non-configured. This information can then be collected by, for example, an RFID reader by reading the RFID tag. Using the memory of the RFID tag to store and provide such information can enable the user to obtain key information regarding one or more products associated with the RFID tag by scanning the RFID tag with any RFID reader, without any further interrogation. As the status of the various properties being monitored change, the values corresponding to the updated status change and the RFID tag can update such values stored in the data field (memory) for storing the values corresponding to the status, such as the data field (memory) of the RFID tag used for storing a serial number of the product, such that the updated data in such data field (memory) represents the updated status of the product(s), or updated status of the card holder's purchasing quota remaining. In an embodiment that uses the data field (memory designed to store a product's serial number to store values representing the status of some property related to the product(s)), the RFID tag's TID (the RFID tag's manufacturing ID), or a portion of the serial number such as UID, can still be used to identify the unique RFID tag. In a specific embodiment, the unique RFID tag is one RFID tag of a set of RFID tags, where the set of RFID tags is a subset of all RFID tags worldwide.

Figure 5:
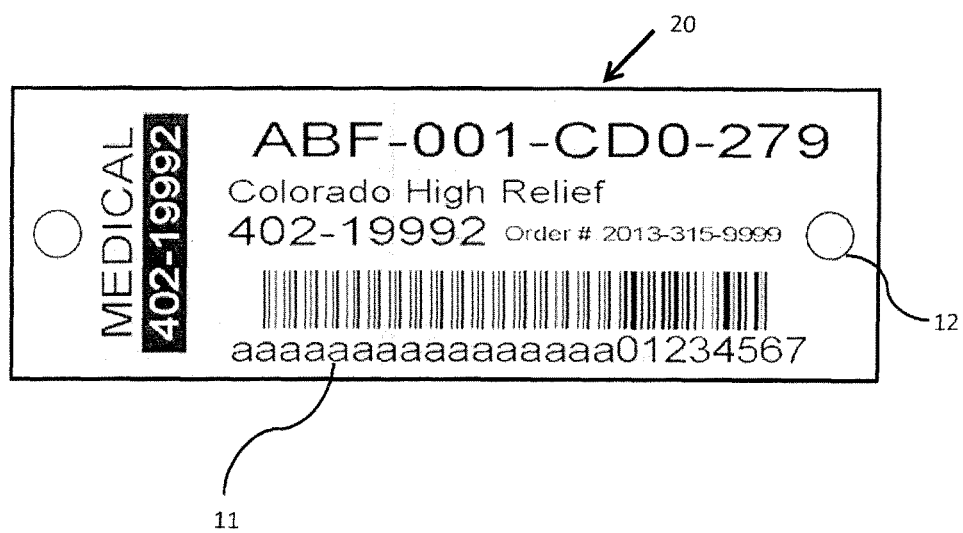
FIG. 5 shows a printed RFID label.

FIG. 5 illustrates a label having the following dynamic data elements on it:
 Tag TID value: ABF-001-CD0-279
 OPC Name: Colorado High Relief
 OPC License #: 402-19992

Order Date for tag: 2013-315-9999 (Year-Day of year-Day batch number)

Tag EPC (Electronic Product Code): aaaaaaanaaaa 01234567

In a specific embodiment the EPC format of the tag can be in the format of 24 hex characters FFF FF FF FFFFFFF FFFFFFFFFF where each F is described as in the following sequence:

Header:
- Description: Tag identifier—allows applications to filter certain tags, such as Metrc tags, immediately
- Size: 3 hex characters
- Maximum Value: FFF
- Fixed Value: 1A4

Install ID:
- Description: Identifies entity that generated the EPC, such as the individual Metrc installations, e.g., a first entity can be install ID 0
- Size: 2 hex characters
- Maximum Value: FF
- Value: Starts at 0, and is determined based on the entity that generated the EPC number, such as the individual Metrc installation that generated the EPC number Note: The following fields are implemented for a specific embodiment, INSTALLID 0. Additional implementations may use the same exact format, or may have different requirements.

Tag Version:
- Description: Unique version number defining the rest of the EPC format. The version number is specific to the Install ID and represents the product type as well, i.e. Plant, Package, etc.
- Size: 2 hex character
- Maximum Value: FF
- Value: Starts at 0, and is determined based on the individual entity that generated the EPC number, such as the Metrc installation that generated the EPC number The tag version element also defines the Product Type of the label.

Examples of tag versions are as follows:

| Version | Product Represented | Active | Serial Number Type | Notes |
|---|---|---|---|---|
| 0 | Medical Plant | False | Hexadecimal | Switched to version 4 to use decimal serial number |
| 1 | Medical Package | False | Hexadecimal | Switched to version 5 to use decimal serial number |
| 2 | Retail Plant | True | Decimal | |
| 3 | Retail Package | True | Decimal | |
| 4 | Medical Plant | True | Decimal | |
| 5 | Medical Package | True | Decimal | |

License No.:
- Description: Facility license number, encoded as hex—for example the ID 0 entity can have facility license numbers that are numeric for medical plant licenses and contain a single R for retail plant licenses. For Tag Versions 2 and 3, representing Retail Product Types, the encoder creates the hexadecimal version of the license number without the "R". During decoding of the license number for Tag Versions 2 and 3, the "R" is inserted in the proper position in the decoded license number string.
- Size: 7 hex characters
- Maximum Value: FFFFFFF
- Value: the license number of the facility where the Plant or the Product (item) was created Serial No.:
- Description: Number making combined epc number globally unique
- Size: 10 hex characters
- Maximum Value: FFFFFFFFFF
- Value: Starts at 0 Per Tag Version Along with a serial or EPC number, a TID (Though Transponder ID) can also be encoded with a unique serial number for the authenticity of the RFID label. The TID is a read-only number written to the RFID microchip by the chip manufacturer. A counterfeiter could copy the EPC number to another tag, but not the TID number. For the visual authenticity inspection, the RFID labels can have security features such as holograms or threads embedded to the RFID label. Both the strap color and the RFID label color can also be changed periodically. These security features can give more control over the RFID tags to the regulatory agent, in order to reduce the likelihood of counterfeiting.

In specific embodiments, the RFID inlay can incorporate extended memory, which can store information. This storage can be used to store information such as one or more of the following: when the seed or stem was potted, moved, repotted, harvested, inspected, weight of plant, weight of harvest, dates of event, and other events that are relevant to tracking the life cycle of the plant. The RFID inlay can be configured so that only specific RFID readers (writers) can write to, or update the information stored in, the extended memory, or the extended memory can be such that further information can be added, but no information can be deleted.

In specific embodiments, the RFID inlay can have an extended EPC number, such that certain portions of the EPC field can be used to store coded information. Information read from the RFID inlay can then be inputted into a computer system and used for tracking the plant from seed or stem, or other point in the life cycle, through harvest, or other point in the life cycle, such as through sale and/or distribution.

Figures 6, 7:
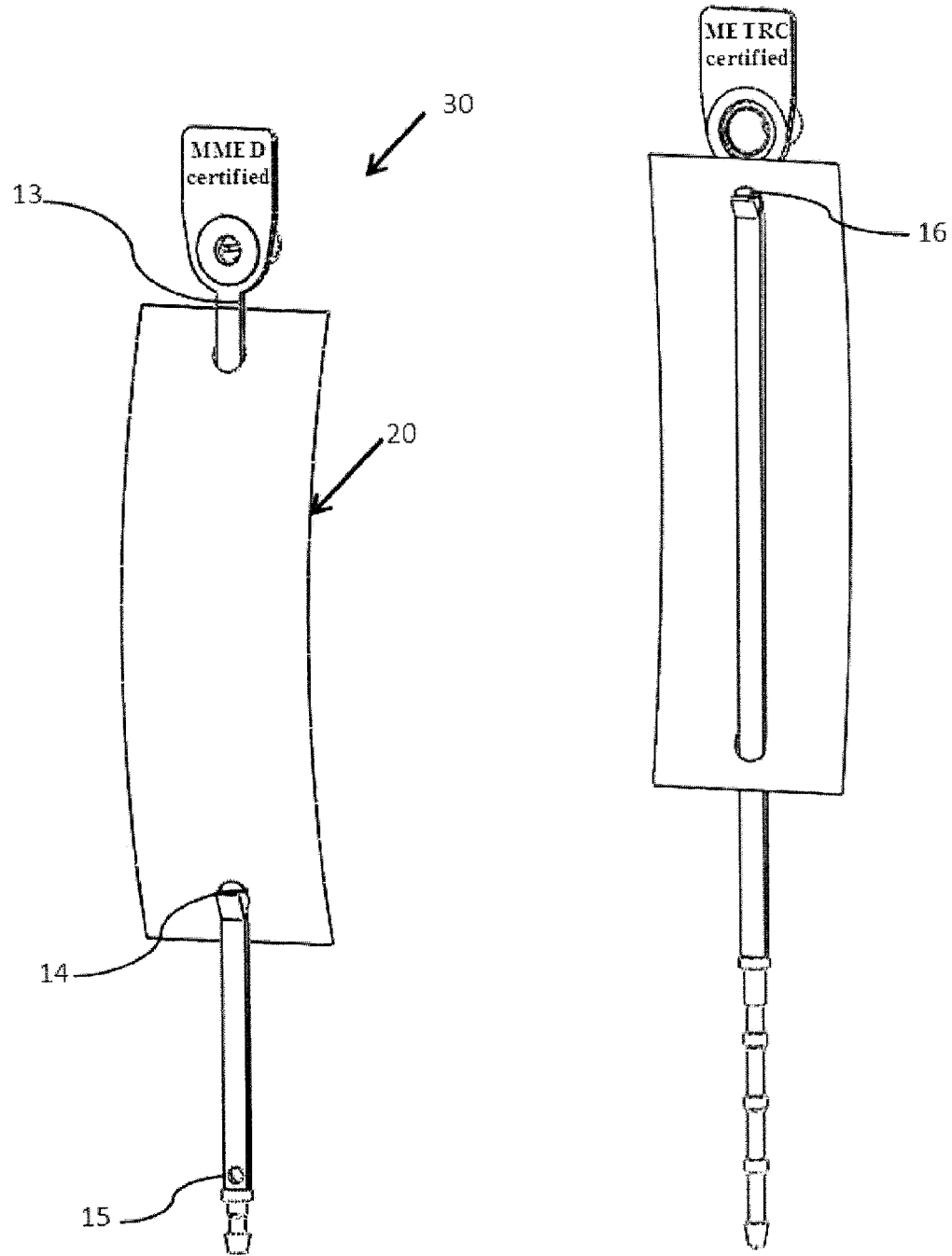
FIG. 6 shows an assembly of a tag incorporating the strap of FIG. 1 and the RFID label of FIG. 4, which is assembled in non-hanging configuration that can be used for small plants.
FIG. 7 shows an assembly of a tag incorporating a strap with a notch on the top and the RFID label of FIG. 4, which is assembled in non-hanging configuration that can be used for small plants.

FIG. 6 illustrates an assembled RFID tag 30 in a configuration that can be used for tagging the small plants by inserting the strap 10 into the soil, or water, in the small pot. Specific embodiments can incorporate one or more extra features that can guide the user during assembly of, and/or use of, the RFID tag 30. An embodiment can incorporate a mark 13 on the upper side of the strap that may be used to indicate the location of the top of the label portion 20 with respect to the strap once assembled. The end of the label portion 20 can be aligned with this line 13 as shown in FIG. 6 to help prevent the label portion 20 from touching. Similarly notch 14 can be added to the strap to prevent the tag from sliding down the strap once assembled and the opening 9 is above the notch 14. Based on the tag performance the distance between the label portion 20 and the soil/water can be adjusted since every tag will be affected differently from the absorption of the RF waves by the solid/water in the pot. The size of the small pot, length of the label portion, location of notch 14, and length of strap can be adjusted so that the label portion does not contact the dirt/moisture even if the tooth of the strap hits the bottom of the pot. The notch 16 can also be located on the upper side of the strap as in FIG. 7.

In a specific embodiment, the mark 13, located near the proximal end of the strap, can be modified to have a raised portion that prevents the RFID label from sliding axially back toward the distal end of the strap once the RFID label is positioned proximal to modified mark 13, or requires the RFID label be rotated about a longitudinal axis of the strap and/or rotated about an axis perpendicular to the longitudinal axis of the strap to be moved axially toward the distal end of the strap to a position distal to the mark 13. In such an embodiment insertion of the strap through single hole 9 can be sufficient. The distal end of the RFID label can then be inserted into a slot on the strap, or another to interconnect the distal end of the RFID label to the strap, to hold the RFID in position.

The strap can also have a weakened spot 15 at the body close to the teeth area for the strap to be cut easily when the user is ready to remove the tag from the plant.

Figure 9:
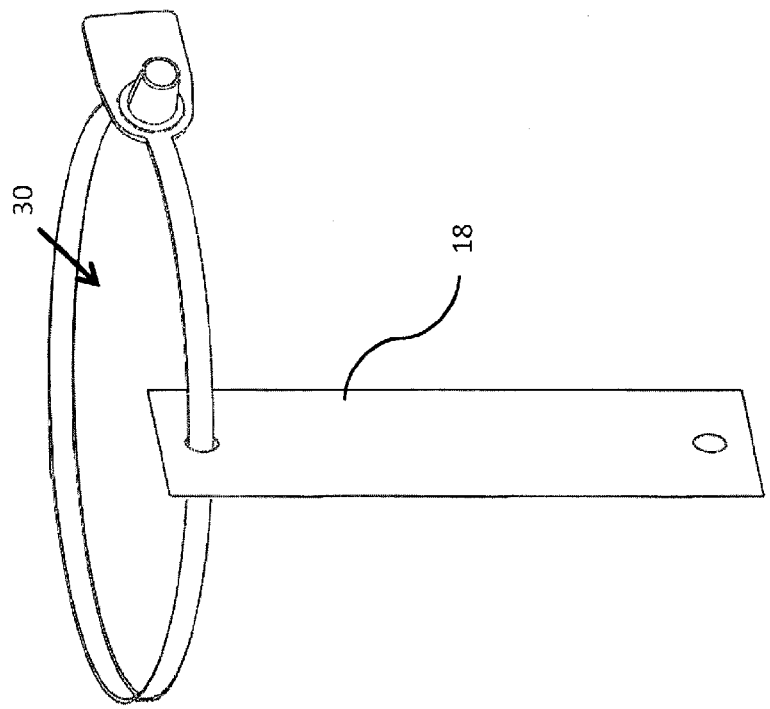
FIG. 9 shows the tag of FIG. 8 in the hanging position of the tag after the ends of the strap are coupled together.
Figure 8:
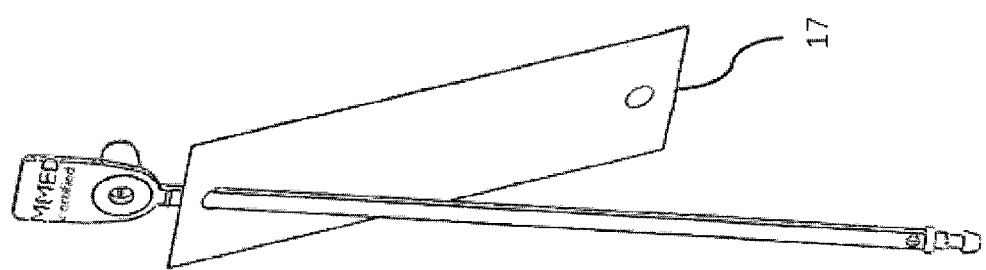
FIG. 8 shows the tag of FIG. 6 after transitioning from a non-hanging to a hanging tag configuration that can be used for bigger plants.

FIG. 8 shows the tag of FIG. 6 after one end 17 of the RFID label 20 has been freed from interconnection with the strap 10. The configuration of the RFID tag 30 in FIG. 8 can be referred to as a hang tag configuration. The hang tag configuration is useful for plants that are bigger, as one end of the RFID label can be interconnected with the strap and the strap wrapped around one of the main branches of a plant as shown in the FIG. 9 (plant not shown). It is preferred to hang the RFID tag 30 on a branch that will not be trimmed or use a strap design as in FIG. 3 so that the RFID tag will stay on the plant throughout its life cycle. Releasing one end of the RFID label 20 enables the RFID label to be straight, and tending to vertical, when the tag 30 is attached to a branch of the plant. In an embodiment, the hole 9 on the label portion and the cross-sectional shape of the portion of the strap body 4 that the hole 9 will be in contact with, are configured such that the RFID label 20 tends to settle into an orientation that is substantially vertical as there is not sufficient friction between the hole 9 and the strap body to prevent the label portion from rotating, due to the weight of the RFID label. In a specific embodiment, hole 9 is circular, such that the label will rotate freely and tend to orient perpendicular to the ground 18. In this way, the RFID label being oriented in a predictable direction will increase the read performance of the RFID tag. In this way, the hanging position of the strap, when the RFID tag is in the hang tag configuration, tends not to affect the read performance of the RFID tag.

Figure 10:
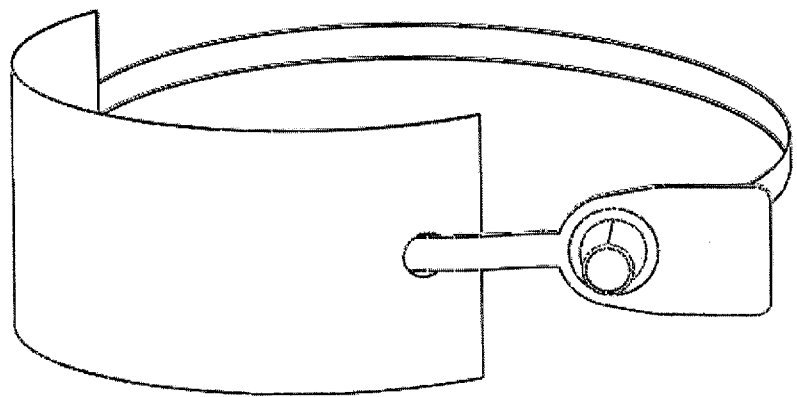
FIG. 10 shows the tag of FIG. 6 in the non-hanging position after the ends of the strap are coupled together.

In specific embodiments, the RFID label can be interconnected with the strap such that when the RFID tag is attached to plant the RFID label maintains its position relative to the strap, as shown in FIG. 10. The position shown in FIG. 10, which results in a bending of the RFID label 20, can be used if the RFID inlay is not affected by bending or the degradation of the read performance is not a concern. In an embodiment, the notch 14, or other structure, or the strap can limit the rotational orientation of the RFID label relative to the strap body. The rotational orientation of the RFID label in FIG. 6 is rotated 180 degrees compared to the rotational orientation of the RFID label with respect to the strap body in FIG. 10. The notch 14, and/or other structure on the strap, can orientate the label rotationally and/or axially with respect to the strap body, and the orientation of the tooth 1 and secure lock 2 can be such that when tooth 1 is locked into passage 2, the RFID label is fairly flat. As an example, the rotational orientation of the RFID label with respect to the strap shown in FIG. 10 can be maintained by the notch 14 and/or other structure on the strap and the strap body can be configured such that when the tooth is inserted into the passage, then the strap body passes through the holes 9 at angles that allow the RFID label to remain flat, or with the RFID inlay having a radius of curvature large enough that the read performance of the RFID tag is satisfactory.

Figure 11:
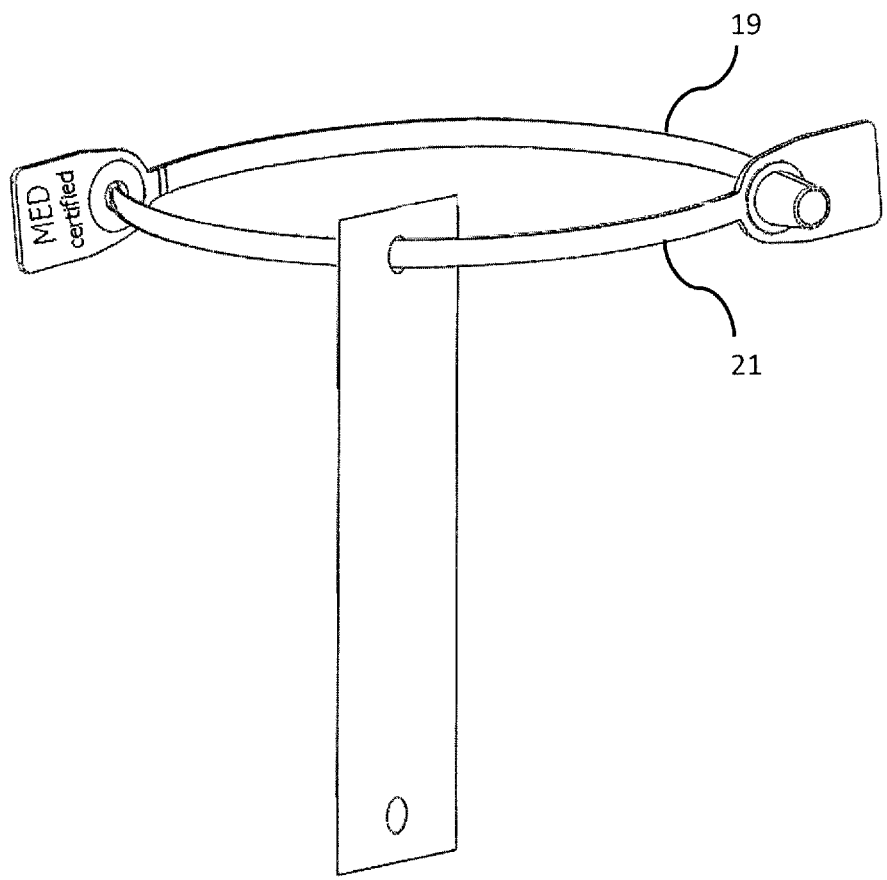
FIG. 11 shows two straps, where the end of a first strap is coupled to the end of a second strap and the other end of the first strap is coupled to the other end of the second strap.

If the circumference of the plant branch is bigger, or is expected to eventually be bigger, than the strap circumference when the ends of the strap are coupled, two or more straps 19 and 21 can be attached together when hanging the RFID tag, as shown in FIG. 11.

When the plant is big enough that a branch can hold the weight of the RFID tag 30, the tag can be hung with one end of the strap taken out from the RFID label and the strap wrapped around the main stem just above the first branch that will not be trimmed or around the first branch if grower lets the plants get bigger than usual.

Embodiments of the invention relate to an RFID buy card system and method that can control and/or record sales and/or transfers of the product. Such control and/or recording can facilitate the matching of the amount of product sold and/or distributed with the plants grown. In an embodiment, the sale and transfer the transactions can be tracked. However, to prove that each transaction is legitimate and falls under the regulated amounts authorized to a person, within an authorized timeframe the transactions can be individualized such that the person receiving the product and the person transferring the product are recorded.

In specific embodiments, an RFID buy card can be provided to a person that is authorized to purchase or obtain product, within some constraints such as quantity, time periods, value, and/or other metrics. These RFID buy cards can be assigned to a person using identifications relating to the person, such as finger print, legal ID card, iris scan, or any other identification matrix or a biometric data. The use of the RFID buy card can then help the person maintain privacy of certain personal information. The RFID buy card can be for one time use, limited as to the total amount that can be purchased or obtained, and the person can then discard the RFID buy card after the transfer, or the RFID buy card updated to allow further purchases and/or transfers. In an embodiment, the RFID buy card is treated as a permanent card that can be "replenished" as the allowed time frame(s) pass, or the system automatically recognizes the account with a right to buy again. The transactions can either be kept on the card or on a common software platform that can be used for tracking sales, and/or tracking the life cycle of the plant through the sale and/or distribution, or any portions thereof.

Figure 12:
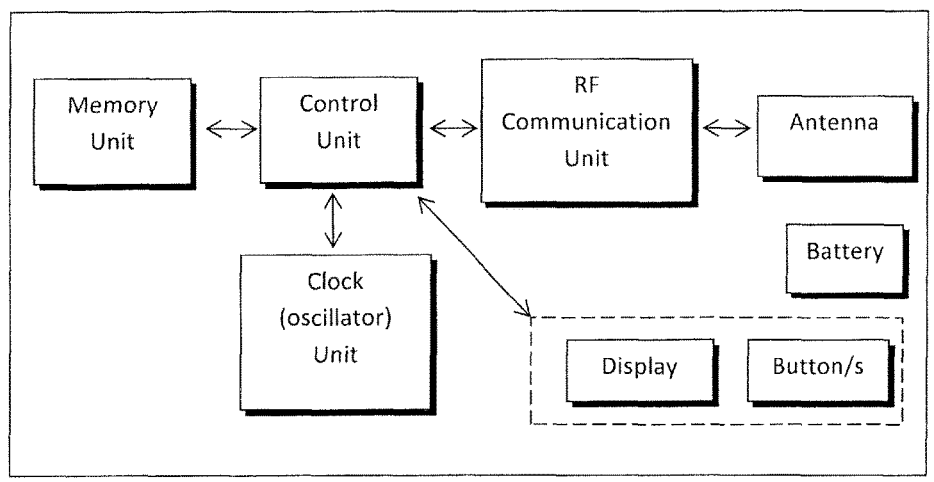
FIG. 12 shows a schematic of an embodiment of an RFID buy card in accordance with an embodiment of the subject invention.

FIG. 12 illustrates a block diagram of a specific embodiment of a RFID buy card. Embodiments of the invention may contain additional elements not shown here, may not include all of the elements here presented, or the elements shown may be differently arranged. In a standalone card design that doesn't require any host system to track the right to buy, the card A battery assisted RFID buy card design can be used. The card can incorporate extended memory, which can store information. This storage can be used to store information such as one or more of the following: time windows during which purchases can be made, amount(s) of product that can be purchased, an identification (any identification matrix and/or biometric data) of a person or persons that can purchase, type of product that can be purchased, prior purchases (e.g. dates, times, locations, vendors, quantity, and/or type of product), and/or other information relevant to tracking sales and distributions of the product. The identification of the person can either be entered to the card at the time of purchasing the card itself or in a more complex card design a biometric data such as a finger print can be scanned on the card and the user can re-scan his/her finger print to activate the card or the seller can require the buyer to scan his/her finger print at the store's scanner. The card can also display the amount that can be purchased within a certain time-frame. The display can be activated via a button for power saving purposes. The user can also set up a password to unlock the card for purchasing and enter the password on the card prior to the transaction. The display can also be used to show the confirmation of the activation or the password entrance.

In specific embodiments, a passive RFID buy card can be used. It can have an EPC number tied to a person through common software and/or an extended EPC number, such that certain portions of the EPC field can be used to store coded information. The EPC read from the RFID buy card can then be inputted into a computer system and used for tracking sales and/or distributions, and tracking product authorized to be purchased by person(s) and whether such product is purchased.

In specific embodiments, the RFID buy card can be configured so that only specific RFID readers (writers) can write to, or update the information stored in, the extended memory, or the extended memory can be such that further information can be added, but no information can be deleted.

Embodiments can utilize RFID buy cards and RFID readers, such that only such RFID readers can read the RFID buy cards or portion of the information stored on the cards. Specific embodiments can allow the RFID readers to update or add information to the RFID buy cards.

In an embodiment, an authorized vendor would read the RFID buy card of a person, submit the date read from the RFID buy card to a designated approved entity (e.g., a computer system) and receive approval to transfer the product to the person or not receive such approval. The approval can be, for example, for a requested transfer, for a transfer having certain metrics (e.g., size, time window, type of product, etc.), or other. The vendor can submit the request for approval via the internet, telephone, email, text message, or other mode of communication. In specific embodiments, vendors can receive authorization by reading the RFID buy card presented by a person with an RFID reader, such as an authorized RFID reader having the hardware and/or software needed to read the RFID buy card and proceed with an authorized sale and/or distribution if the information read from the card includes information required for the vendor to proceed, such as an indication of amount and time window of purchases and/or distribution authorized. Specific embodiments can then update the information stored on the RFID buy card to indicate an updated amount of product still authorized to be purchased and/or distributed, and, optionally, other information, e.g., relating to the sale.

In an embodiment, the RFID buy card can be purchased from a vending machine where the machine approve the user to buy the card and it can configure the buy card or write to it some necessary information such as the identification of the user, the date which can also be used as a real time clock set point in a battery assisted tag, the amount that the user is allowed, and etc.

In an embodiment, the RFID buy card can be used for purchasing a product from a vending machine.

Embodiments of the invention pertain to the use of a method and system using an RFID antenna array, an array controller, and control algorithms. Specific embodiments can incorporate an RFID antenna array and system as taught in U.S. Pat. No. 8,593,283, which is hereby incorporated by reference in its entirety. Embodiments of the invention can induce strong radio-frequency (RF) excitation, for a given level of radiated RF power, at any point within an arbitrary inhomogeneous medium, such as an environment having multiple plants in a region of interest, and/or a warehouse environment having stored goods together with shelving and other material present. An embodiment of the invention is applicable to the process of reading battery-less, or "passive" RFID tags, which rely on incident RF electromagnetic fields established by RFID readers to power the electronic circuitry within the tags.

In one aspect of an embodiment of the subject invention, a wearable RFID system is provided, including an antenna, an RFID reader, a host system, and a holder for holding at least the antenna and the reader. In specific embodiments, the wearable RFID system also incorporates a transmitting antenna or interrogator in the holder, for production of an interrogation RF signal that creates a response RF signal upon incidence on a RFID tag or transponder. The RFID reader can drive the transmitting antenna or a separate transmitter can be provided. In a specific embodiment, one antenna acts as both the transmitting antenna and the receiving antenna. In alternative embodiments, the transmitting antenna can be separate from the holder, and/or not attached to the wearer of the holder. Similarly, the host system can be located on the holder, worn elsewhere on the user, or located remotely from the user, in which case the RFID reader communicates remotely with the host system. In an embodiment, the RFID reader incorporates at least part of the host system. The antenna receives RF signals from one or more RFID tags. The reader collects the signals from the antenna and the host system process these signals to retrieve information about the RFID tag.

In another aspect of an embodiment of the subject invention, a method of using the system to identify objects with attached RFID tags is also provided in which the holder is worn by a worker while the worker moves objects, such as potted plants, from one place to another or interacts with it, such as budding, trimming, and etc. When the holder handles the object with an attached RFID tag, the RFID reader scans signals from the object's RFID tag received by the antenna. The scanning can begin automatically or can be triggered by an input from, for example, the user and/or a sensor. When a RF signal is received by the antenna, the RFID reader collects the signal and transmits it to the host system as described above. The host system then processes the signal to obtain information about the RFID tag. In a specific embodiment, no additional or specific action by the worker is required to initiate interrogation and scanning. Therefore, the worker is able to handle the objects normally without any extraneous movement or time. In fact, in some embodiments of the invention, the worker may not even know that the holder the worker is wearing incorporates an RFID system.

In further embodiments, the RFID system incorporates other identification apparatus, such as a barcode scanner, to corroborate the radio frequency identification of handled items. Specific embodiments can incorporate a wearer RFID reader and system as taught in U.S. Pat. No. 8,674,810, which is hereby incorporated by reference in its entirety.

A typical RFID system includes a tag, a reader, an antenna, and a host system. The reader gathers information about an object by communicating through the antenna with the tag attached to the object and the host system processes the data collected by the reader. The host system can be housed on the reader or the reader can communicate information to the host system for additional processing.

RFID tags include a memory which typically stores data related to the object. The data stored varies in different applications. For example, in simple applications the data stored may be a single bit indicating the existence of the object. In other applications, a serial or other identification number related to the tag or a tagged object may be stored.

In further applications, environmental data may be stored on the tag such as the lowest temperature, highest humidity, or vibrations to which the object was exposed. The data stored on the tag can be read and sometimes written to via an RF antenna. Embodiments of the subject invention can work with any number RFID tags that are well known in the art.

Typically, an interrogation RF signal is transmitted to begin communication with an RFID tag. The interrogation RF signal causes the tag to become "excited" when the interrogation RF signal is incident on the tag and the interrogation signal's electromagnetic field, magnetic field, or both excites the tag. The tag then produces a response RF signal that encodes data stored on the tag. The response RF signal may be received by the same RF antenna that transmitted the interrogation RF signal or by a different receiving RF antenna. Regardless, an RFID reader collects the response RF signal from the receiving antenna and transmits the signal to a host system that decodes the signal to obtain information about the tag. Different software can then be utilized by the host system to operate different applications. For example, RFID can be used to facilitate identification, authentication, sorting, product/case put away, tracking, inventory management, supply chain management, pricing, quality control (via processing, for example, temperature or humidity data on the tag), and acceptance/declining of the received or shipped products, among other applications. The examples provided herein are merely illustrative. Other applications of RFID are well known in the art and can be used with the subject invention.

Figure 13:
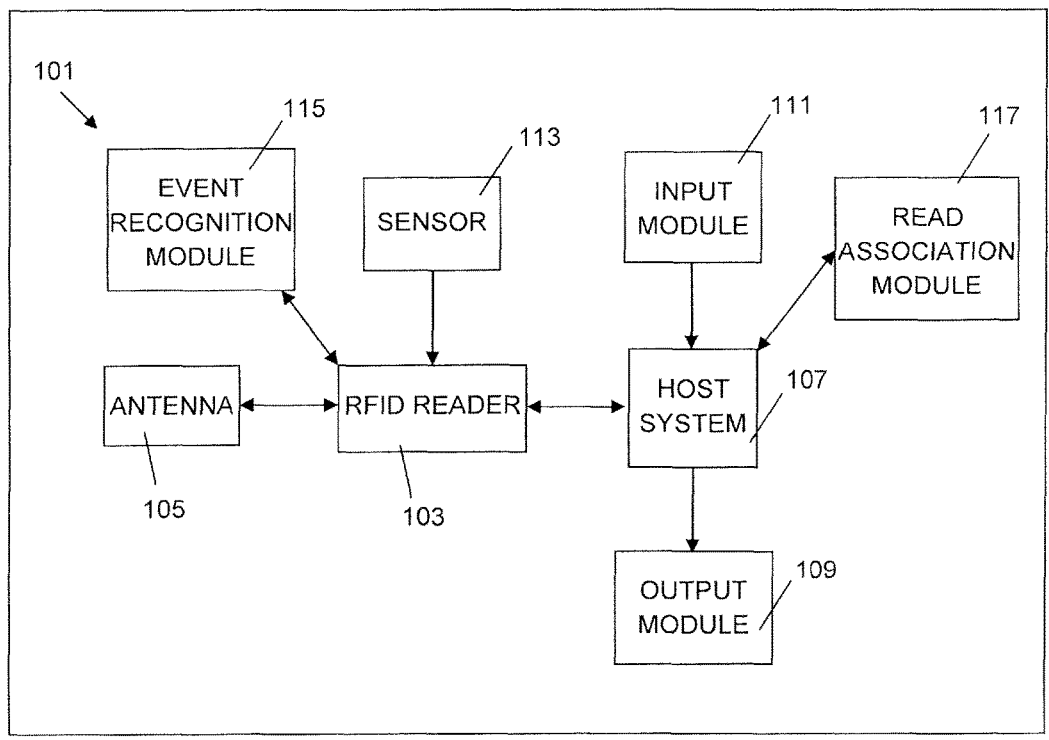
FIG. 13 shows a functional block diagram of a system in accordance with an embodiment of the subject invention.

FIG. 13 shows a functional block diagram of a system 101 in accordance with an embodiment of the subject invention. This figure merely depicts one example of such a system. Embodiments of the invention may contain additional elements not shown here, may not include all of the elements here presented, or the elements shown may be differently arranged.

In one embodiment of the subject invention, an RFID reader 103 receives a response signal form a receiving antenna 105 and merely transmits that signal on to a host system 107 for further processing. The host system 107 can be housed with the reader 103 or the signal or information related to the signal can be communicated by the reader 103 to the host system 107 for further processing.

In another embodiment of the subject invention, the RFID reader 103 is responsible for driving transmitting and receiving antennas. The transmitting antenna can be used to send interrogation signals as is well known in the art. In some embodiments, the transmitting and receiving antennas are one in the same. In FIG. 13, both antennas are represented by the antenna 105. In a further embodiment, the antenna 105 may be driven by the reader 103 to write information to an RFID tag and/or an RFID buy card. In an embodiment, the host system itself or a component of the host system, such as an antenna driving module or an RFID reader, can be used to drive the antennas.

In another embodiment, a plurality of antennas can be used. In an embodiment, a first antenna of the plurality is a transmitting antenna, and a second antenna of the plurality is a receiving antenna. In an embodiment, the first antenna can also operate as a receiving antenna. In an embodiment, the second antenna can also operate as a transmitting antenna. In an embodiment both antennas are mono-static used for both transmitting and receiving. In an embodiment, the second antenna is removeably connected to the system 101 such that the system can be used with or without the second antenna. In an embodiment, the first and second antennas are each positioned or otherwise configured to interrogate and/or receive RF signals from different RFID tags. Thus, the first antenna is configured to interrogate and/or receive RF signals from a first type of RFID tags, such as RFID tags positioned with respect to plants, and the second antenna is configured to interrogate and/or receive RF signals from a second type of RFID tags, such as RFID buy cards. In an embodiment, the first antenna can be configured to interrogate and/or receive RF signals from RFID tags attached to plants handled by the user, while the second antenna can be configured to interrogate and/or receive RF signals from RFID tags positioned at locations, in the facilities where the tagged plants are housed, passed by the user, or vice versa. In another embodiment, using the first and second antennas for RFID tags on plants and RFID tags at locations in the facility where the plants are housed, a third antenna can be configured to interrogate and/or receive RF signals from RFID buy cards presented by persons requesting to purchase and/or receive product.

In yet another embodiment of the subject invention, the host system 107 decodes response RF signals to obtain information about RFID tags and/or RFID buy cards, the plants or locations the RFID tags are attached to, the person presenting the RFID buy card or both. For example, the host system 107 may decode a response RF signal from an RFID tag to obtain data stored on the tag such as a serial number corresponding to a plant or product that the RFID tag is attached to, or other data stored on the tag, or other data useful in various RFID applications.

In a further embodiment of the subject invention, the host system 107 also encodes RF signals used to write data to RFID tags and/or RFID buy cards. The RFID reader 103 can then drive the antenna 105 to write such signals to RFID tags and/or RFID buy cards. The RFID reader (writer) may store information on a RFID tag such as when planted, where located at various sizes, when harvested, and/or other information. This information can later be retrieved from the tag as described above and known in the art. For example, the system 101 can be used to read a Gen2 RFID tag and/or RFID buy card and, according to an authorization protocol, the host system 107 can then output a message to a user that authorization is granted or not granted. In an embodiment, the host system itself or a component of the host system, such as an antenna driving module or an RFID reader, can be used to drive the antennas.

In further embodiments, the host system 107 performs more complex information processing. The host system 107 may comprise a database or other memory for storing data related to tagged plants, person presenting the RFID buy card or processing parameters. For example, a serial number obtained from an RFID tag or RFID buy card may be looked up in a database to obtain the particulars of a tagged product or other stored information about the product and/or particulars regarding type of sale and/or receipt of product authorized. Or information from the RFID tag and/or RFID buy card may be stored in the host system's memory for further use. As will be obvious to one skilled in the art, such a memory may be incorporated into the host system 107 or may be accessible via a network.

In an embodiment, the host system 107 includes a read association module 117. In an embodiment, the read association module 117 facilitates associating information decoded from one or more response signals received by the RFID reader 103 with other available information. For example, in an embodiment, the read association module associates a product serial number or other information obtained from an RFID tag with information about the product stored in a database as discussed above. In an embodiment, the module associates information received from a response signal with a particular time or location. In an embodiment, the response signal is associated with the time the signal was received. In an embodiment, the response signal is associated with the location or the RFID reader 103 or antenna 105 at the time the signal was received. In an embodiment, the position of the RFID reader 103 or antenna is triangulated from wireless transmissions of the RFID reader 103 or antenna 105. In an embodiment, information from two or more response signals is associated such as information from a product's RFID tag and information from a person's RFID buy card. In an embodiment, RFID tag IDs and/or other information encoded in the response signals are used to associate the signals. In an embodiment, information from two or more response signals received within a certain distance of each other or within a certain area is associated. The location of a response signal can be determined in various ways as described above. In an embodiment, the order in which two or more response signals are received is used to associate one or more signals with a time, location, each other, or other available information. In an embodiment, the rate at which response signals are received from at least one tag is used to associate the at least on tag with a time, location, each other, or other available information. In an embodiment, information from two or more response signals received within a certain time of each other or within a certain time period are associated. For example, as further discussed below, information from a plant or product RFID tag attached to a plant or product can be associated with information from an RFID tag attached to a doorway when an object response signal is received from the plant or product RFID tag in close temporal proximity to a location response signal received from the RFID tag attached to the doorway. Thus, information regarding the plant or product can be associated with information regarding the location. Similarly, information about a plant can be associated with information received from an RFID tag attached to a pot near the plant, or attached to other plants nearby. In an embodiment, the plant is associated with a pot when the plant is positioned in the pot. In an embodiment, the plant is associated with a pot when the plant is taken from the container. In an embodiment, read order, read rate, and/or other information are used to differentiate signals received from a plurality of RFID tags in the read field, before an association is made. As is known in the art, the functions of the read association module 117 can be distributed in various ways. For example, all or part of the read association module can be stored and/or executed on the host system 107, the RFID reader 103, or another device in communication with the RFID reader 103.

In a particular embodiment, the host system 107 incorporates an output module 109 to present information to one or more users of the system 101. The output module 109 can present such information using various output devices such as visual displays, audio speakers, printers, or other output devices known in the art. This information may be utilized to confirm correct processing or further direct processing of the tagged items, among other applications. In further embodiments, the host system also incorporates an input module 111 which can utilize various input devices known in the art to facilitate interaction with stored data, writing information to RFID tags and/or RFID buy cards, and/or other applications.

As described above, in various embodiments of the subject invention, at least a portion of the host system 107 is incorporated into the RFID reader 103 itself or the RFID reader 103 communicates with the host system via known wireless (e.g., Bluetooth) or wired (e.g., a coaxial or Ethernet cable) communication methods. In a particular embodiment of the invention, Bluetooth is used to communicate information between an RFID reader and a host system and to minimize booting time. In such an embodiment, the Bluetooth unit stays on while the system is in use. In addition to Bluetooth, other communication methods can be used such as GSM/GPRS, Satellite, WIFI, Zigbee, or other wired or wireless communication methods. The examples provided herein are merely illustrative. Other communication methods are well known in the art and can be used with the subject invention. The reader can also communicate with a remote host system via, for example, the internet or other communication channel.

The host system 107 can be incorporated or removeably attached to a wearable holder worn by the user of the reader same or a different worker. The host system 107 can also be incorporated into a personal or other computer system such as a desktop or a laptop computer or server.

Authorization can be provided by an event recognition module 115, which can take in information received from an RFID buy card, as well as other information, such as from a sensor 113 (e.g., iris scanner, fingerprint, signature reader, and/or scanner), and/or authorization can be provided by the host system 107.

In a further embodiment of the subject invention, the RFID system 101 is used for plant or product identification and the RFID reader or host system incorporates other identification apparatus, such as a barcode scanner, to corroborate the radio frequency identification of read items. Collected information may be presented and manipulated on a host system as described above. For example, in an embodiment of the invention, a user can correct inconsistent information received from a plurality of sources via the host system. Identification apparatus can be incorporated into the body of the reader device or host system, or communicate through a wired or wireless connection. For example, a barcode scanner may be connected to the reader via a Universal Serial Bus (USB) Port. Other peripheral devices may also be connected to the RFID reader or host system for operation, processing, storage, or presentation. For example, other input and output devices such as printers, speakers, microphones, keyboards, buttons, touch screens, among other devices, can be incorporated. Input and output modules 111 and 109 may facilitate communication with such devices. Other storage media or devices may also be incorporated. A battery may be incorporated into the RFID reader, an antenna, or other part of the RFID system to provide power to the RFID system. Alternatively, a battery or other power source may be connected to the RFID system using known methods. The examples provided herein are merely illustrative. Other peripheral devices are well known in the art and can be used with the subject invention.

Embodiments of the subject invention may use one or more antennas or antenna arrays for transmitting and receiving magnetic or electromagnetic signals. Such antennas can be incorporated into the same housing as an RFID reader such as a rigid or flexible compartment. Antennas can also be connected to an RFID reader using a coaxial cable or other connection technology known in the art. Elastic straps may be used to hide a cable from the user and for safety and esthetic concerns. Instead of elastic straps, adjustable or plastic straps may be used. The RFID reader or other system component may drive the antennas to produce or receive magnetic or electromagnetic signals at any number of frequencies including but not limited to LF, HF, UHF, and Microwave frequencies. The signals sent or received may be encoded using any number of known modulation methods including but not limited to AM, SSB, FM, PM, SM, OOK, FSK, ASK, PSK, QAM, MSK, CPM, PPM, TCM, OFDM, FHSS, and DSSS. The examples provided herein are merely illustrative. Other signal passing and encoding methods may be used with the subject invention.

Embodiments of the subject invention may utilize a variety of antenna designs, including but not limited to patch and dipole antenna designs. The antennas can be flexible, semi-flexible, or rigid depending on the dielectric constant and thickness of the material employed. In one embodiment, a semi-flexible antenna is used which can be bent and then retains its shape.

The antennas can be linear polarized or circularly polarized. In one embodiment, linear polarization is used to provide a more directional and powerful signal when the orientation of the tag to be read can be predicted.

Fractal Patch Antennas are known in the art, see I. Kim, T. Yoo, J. Yook, H. Park, "The Koch Island Fractal Patch Antenna" IEEE, Antennas and Propagation Society International Symposium, 2001 volume 2 pg: 736-739, July 2001, and can be employed in embodiments of the subject invention. Fractal microstrip patch antennas use the space filling properties of fractal geometries on existing microstrip square patch antennas. By using fractal patterns, lower resonant frequencies can be achieved using the same patch size. This allows the same resonant frequency to be produced using a smaller antenna footprint, thus enabling an antenna that can be workably positioned on various parts of the human body.

Various system settings or configurations can be used with a system, device, or method of the subject invention for the various applications and/or use-case scenarios. In an embodiment, a system, RFID reader, or other device of the subject invention can be configured for use in various applications or use-case scenarios. For example, in an embodiment, components of the system can be positioned in different locations, orientations, or manners as discussed above. In an embodiment, different power output levels can be used with one or more antennas as discussed above. In an embodiment, different types of RFID tags can be interrogated. In an embodiment, a system, device, or method of the subject invention supports interrogation of a plurality of RFID tag types. In an embodiment, the plurality of RFID tag types includes tags complying with UHF Class 0, Class-1 Generation-2, and Class-3 standards. In an embodiment, the plurality of RFID tag types includes tags complying with Class-1 Generation-2 and Class-3 standards. In an embodiment, the plurality of RFID tag types includes tags complying with UHF Class 0 and Class-1 Generation-2 standards. In an embodiment, the plurality of RFID tag types includes tags complying with UHF Class 0 and Class-3 standards. In an embodiment, the plurality of RFID tag types includes fully-passive tags and/or battery-assisted tags. In an embodiment, the plurality of RFID tag types includes dipole and/or dual dipole tags. In an embodiment, the plurality of RFID tag types includes metal mount tags. In other embodiments, other classes or types of tags can be interrogated. In an embodiment, different RF wavelengths can be used as discussed above. In an embodiment, multiple frequency bands, such as 13.56 MHz, 915 MHz, and/or 2.4 GHz, among other bands, can be supported at the same time. In an embodiment, different read triggering schemes can be used, such as manual or automatic read triggering, as discussed above. In an embodiment, different information processing schemes can be used, such as processing of received RF signals by an internal or external host, as discussed above.

In a further embodiment, a smart phone, or other electronic device, such as a laptop, tablet, or watch, can utilize an app or other software application during transfer transactions instead of an RFID buy card or in conjunction with an RFID buy card. The electronic device, e.g., smart phone can incorporate a portion of or all of the logic taught in the subject patent application as incorporated in embodiments of the subject RFID buy card, and a QR code or a NFC code of the smart phone (or other electronic device) can be matched to an acquiring entity, such as a person. The codes can be approved by the regulatory agency through the app or other software by connecting the electronic device through the internet, or other communication channel, at least once for the authorization. In this embodiment, the teaching with respect to the RFID buy card tracking the transfer transaction through a number (e.g., a unique EPC number for the RFID buy card) and associating the ID of the acquiring entity, e.g., person, including an ID card and/or biometric data also applies for embodiments utilizing such a smartphone, or other electronic device. Such an app can allow the amount of product that the person is allowed to acquire in a certain time period to be shown to the person via the smart phone, or other electronic device.

EMBODIMENTS

Embodiment 1

A method of tracking at least one plant, comprising:

putting at least one seed or at least one stem in a corresponding at least one pot, wherein each pot of the at least one pot contains soil and/or water;

positioning a corresponding at least one RFID tag with respect to the at least one seed or the at least one stem in a manner that each RFID tag of the at least one RFID tag is associated with the corresponding seed or the corresponding stem;

after the at least one seed or at least one stem matures transfers into a vegetative state to become at least one potted plant, repotting the at least one potted plant;

if each RFID tag of the at least one RFID tag is not yet attached to the corresponding potted plant of the at least one potted plant, attaching the each RFID tag of the at least one RFID tag to the corresponding potted plant of the at least one potted plant;

after the at least one potted plant matures further, harvesting the at least one potted plant to create a lot or batch of harvested material;

packaging the harvested material into a packaged product; attaching either:
  (i) the at least one RFID tag from the at least one potted plant, or
  (ii) a product RFID tag that is associated with the plurality of tags to the packaged product.

Embodiment 2

The method according to Embodiment 1, wherein the at least one seed or at least one stem is a plurality of seeds or a plurality of stems, wherein the at least one pot is a plurality of pots, wherein the at least one RFID tag is a plurality of RFID tags.

Embodiment 3

The method according to any of Embodiments 1-2,
wherein the plurality of seeds or the plurality of stems comprises at least 100 seeds or at least 100 stems, respectively.

Embodiment 4

The method according to any of Embodiments 2-3,
wherein positioning the plurality of RFID tags comprises attaching each RFID tag of the plurality of RFID tags to the corresponding pot of the plurality of pots.

Embodiment 5

The method according to any of Embodiments 2-4,
wherein positioning the plurality of RFID tags comprises inserting each RFID tag of the plurality of RFID tags into the soil and/or water of the corresponding pot of the plurality of pots and orienting each RFID tag in a desired orientation.

Embodiment 6

The method according to any of Embodiments 2-4,
wherein positioning the plurality of RFID tags comprises attaching each RFID tag of the plurality of RFID tags to the corresponding pot of the plurality of pots or on the corresponding pot of the plurality of pots.

Embodiment 7

The method according to any of Embodiments 2-6,
wherein the plurality of RFID tags are incorporated into a corresponding plurality of RFID tag assemblies,
wherein each RFID tag assembly of the plurality of RFID tag assemblies comprises:
a strap, wherein the strap comprises:
a strap body having a strap body proximal end and a strap body distal end;
a first strap connecting portion attached to the strap body proximate to the strap body distal end; and
a second strap connecting portion attached to the strap body proximate to the strap body proximal end,
wherein the first strap connecting portion and the second strap connecting portion are configured such that when the first strap connecting portion is connected to the second strap connecting portion in a locked position, the first strap connecting portion and second strap connecting portion are in locked connection such that the strap body distal end is in locked connection with the strap body proximal end; and
an RFID label, wherein the RFID label comprises:
an RFID label body having an RFID label body proximal end and an RFID label body distal end;
an RFID circuit, wherein the RFID circuit is attached to the RFID label body;
an RFID antenna, wherein the RFID antenna is connected to the RFID circuit, wherein the RFID antenna is attached to the RFID label body,
wherein the RFID label and the strap are configured to:
(i) interconnect in a first configuration, such that when the first strap connecting portion and the second strap connecting portion are in locked connection, the RFID label does not separate from the strap and an orientation of the RFID label is dependent on an orientation of the strap, and
(ii) interconnect in a second configuration, such that when the first strap connecting portion and the second strap connecting portion are in locked connection the RFID label does not separate from the strap and the orientation of the RFID label is adjustable independently from the orientation of the strap.

Embodiment 8

The method according to any of Embodiments 2-7, further comprising:
associating the plurality of seeds or the plurality of stems with the plurality of RFID tags; and
providing information from the plurality of RFID tags or the product RFID tag attached to the packaged product to a regulatory agency.

Embodiment 9

The method according to any of Embodiments 2-8,
wherein the plurality of potted plants are a plurality of potted marijuana plants.

Embodiment 10

The method according to any of Embodiments 7-9,
wherein positioning the plurality of RFID tags comprises when the strap body of each RFID tag is in the strap body equilibrium position, inserting the strap body of each RFID tag of the plurality of RFID tags into the soil of the corresponding pot of the plurality of pots and orienting each RFID tag in the desired orientation.

Embodiment 11

The method according to Embodiment 10,
wherein if the each RFID tag of the plurality of RFID tags is not yet attached to the corresponding potted plant of the plurality of potted plants, attaching the each RFID tag of the plurality of RFID tags to the corresponding potted plant of the plurality of potted plants comprises for each corresponding strap of the corresponding strap assembly, connecting the first strap connecting portion to the second strap connecting portion in the locked position such that in order to remove the RFID strap assembly from the corresponding potted plant, either (i) the strap must be unlocked, or (ii) the potted plant must be damaged.

Embodiment 12

The method according to any of Embodiments 2-11,
wherein each RFID tag of the plurality of RFID tags comprises:
dynamic data elements,
wherein the dynamic data elements comprise one or more of the following:
tag TID value;
OPC Name;
OPC License No.;
Order Date and Day Batch No. for the RFID tag; and
RFID tag Electronic Product Code (EPC).

Embodiment 13

The method according to Embodiment 12, wherein an EPC format of the RFID tag Electronic Product Code is in a form of 24 hex characters, wherein each hex character of the 24 hex characters can have one of 16 values.

Embodiment 14

The method according to Embodiment 13,
wherein the 24 hex characters are formatted as follows:
FFF FF FF FFFFFFF FFFFFFFFFF,
wherein each hex character of the 24 hex characters can have a value selected from the following:
0, 1, 2, 3, 4, 5, 6, 7, 8, 9, A, B, C, D, E, and F.

Embodiment 15

The method according to any of Embodiments 13-14,
wherein the 24 hex characters are as follows:
a first number of hex characters represent a header;
a second number of hex characters represent an install ID;
a third number of hex characters represent a tag version;
a fourth number of hex characters represent a license no.; and
a fifth number of hex characters represent a serial no.,
wherein the first number plus the second number plus the third number plus the fourth number plus the fifth number equals 24.

Embodiment 16

The method according to Embodiment 15,
wherein the first number is 3, such that the header uses 3 hex characters, wherein the second number is 2, such that the install ID uses 2 hex characters, wherein the third number is 2, such that the tag version uses 2 hex characters, wherein the fourth number is 7, such that the license no. uses 7 hex characters, wherein the fifth number is 10, such that the serial no. uses 10 hex characters.

Embodiment 17

The method according to any of Embodiments 15-16,
wherein the header provides a tag identifier of a plurality of tag identifiers, wherein a first tag identifier of the plurality of tag identifiers allows the RFID tag to be filtered immediately.

Embodiment 18

The method according to any of Embodiments 15-16,
wherein the tag version defines an electronic produce code format for a portion of the Electronic Product Code not including the header and the install ID, such that the tag version is specific to the Install ID,
wherein the tag version is determined based on the generator of the plurality of Electronic Product Code generators generating the Electronic Product Code,
wherein the tag version defines a product type of the RFID tag.

Embodiment 19

The method according to any of Embodiments 15-18,
wherein the license no. defines a facility license no. where a product was created.

Embodiment 20

The method according to any of Embodiments 15-19,
wherein the install ID identifies an Electronic Product Code generator of a plurality of Electronic Product Code generators, wherein the install ID has a maximum value of FF, wherein a value of the install ID is determined based on the Electronic Product Code generator of the plurality of Electronic Product Code generators that the Electronic Product Code.

Embodiment 21

An RFID tag, comprising:
dynamic data elements,
wherein the dynamic data elements comprise one or more of the following:
tag TID value;
OPC Name;
OPC License No.;
Order Date and Day Batch No. for the RFID tag; and
RFID tag Electronic Product Code (EPC).

Embodiment 22

The RFID tag according to Embodiment 21,
wherein an EPC format of the RFID tag Electronic Product Code is in a form of 24 hex characters.

Embodiment 23

The RFID tag according to Embodiment 22,
wherein the 24 hex characters are formatted as follows:
FFF FF FF FFFFFFF FFFFFFFFFF,
wherein each hex character of the 24 hex characters can have a value selected from the following:
0, 1, 2, 3, 4, 5, 6, 7, 8, 9, A, B, C, D, E, and F.

Embodiment 24

The RFID tag according to any of Embodiments 22-23,
wherein the 24 hex characters are as follows:
a first number of hex characters represent a header;
a second number of hex characters represent an install ID;
a third number of hex characters represent a tag version;
a fourth number of hex characters represent a license no.; and
a fifth number of hex characters represent a serial no.,
wherein the first number plus the second number plus the third number plus the fourth number plus the fifth number equals 24.

Embodiment 25

The RFID tag according to Embodiment 24,
wherein the first number is 3, such that the header uses 3 hex characters, wherein the second number is 2, such that the install ID uses 2 hex characters, wherein the third number is 2, such that the tag version uses 2 hex characters, wherein the fourth number is 7, such that the license no. uses 7 hex characters, wherein the fifth number is 10, such that the serial no. uses 10 hex characters.

Embodiment 26

The RFID tag according to any of Embodiments 24-25, wherein the header provides a tag identifier of a plurality of tag identifiers, wherein a first tag identifier of the plurality of tag identifiers allows the RFID tag to be filtered immediately.

Embodiment 27

The RFID tag according to any of Embodiments 24-26, wherein the install ID identifies an Electronic Product Code generator of a plurality of Electronic Product Code generators, wherein a value of the install ID is determined based on the Electronic Product Code generator of the plurality of Electronic Product Code generators that the Electronic Product Code.

Embodiment 28

The RFID tag according to Embodiment 27, wherein the plurality of Electronic Product Code generators are a plurality of regulatory agency entities.

Embodiment 29

The RFID tag according to Embodiment 27,
wherein the plurality of Electronic Product Code generators are a plurality of Metro installations.

Embodiment 30

The RFID tag according to Embodiment 22,
wherein each hex character of the 24 hex characters can have one of 16 values.

Embodiment 31

The RFID tag according to Embodiment 24,
wherein the tag version defines an electronic produce code format for a portion of the Electronic Product Code not including the header and the install ID, such that the tag version is specific to the Install ID,
wherein a value of the tag version is determined based on the generator of the plurality of Electronic Product Code generators generating the Electronic Product Code,
wherein the tag version defines a product type of the RFID tag.

Embodiment 32

The RFID tag according to Embodiment 24,
wherein the license no. defines a facility license no. where a product was created.

Embodiment 33

The RFID tag according to Embodiment 24,
wherein the serial no. results in the RPC being globally unique.

Embodiment 34

The RFID tag according to Embodiment 24,
wherein the header has a maximum value of FFF, wherein the header has a fixed value of 1A4,
wherein the install ID has a maximum value of FF, wherein a value of the install ID starts at 0,
wherein the tag version has a maximum value of FF, wherein a value of the tag version starts at 0,
wherein the serial no. has a maximum value of FFFFFFFFFF,
wherein a value of the serial no. starts at 0 per tag version.

Embodiment 35

A system, comprising:
a processor;
a storage element;
wherein the storage element stores information regarding at least one metric with respect to each product of one or more products that are authorized to be transferred to a corresponding at least one acquiring entity of a plurality of acquiring entities; and
a computer readable medium containing instructions that when executed by the processor cause the processor to:
receive from a transferring entity:
ID information specific to an RFID buy card of a plurality of RFID buy cards, and
a request for authorization to transfer at least one product of the one or more products to an acquiring entity associated with the RFID buy card that the ID information was specific to, and
confirm the requested transfer is within a corresponding metric of the at least one metric with respect to the at least one product that is authorized to be transferred to the acquiring entity,
provide the transferring entity an authorization to transfer the at least one product to the acquiring entity associated with the RFID buy card that the ID information was specific to.

Embodiment 36

The system according to Embodiment 35, further comprising:
the plurality of RFID buy cards,
wherein each RFID buy card is associated with an acquiring entity of a corresponding plurality of acquiring entities,
wherein each RFID buy card comprises:
a card body;
an RFID circuit, wherein the RFID circuit stores ID information specific to the RFID buy card; and
an RFID antenna.

Embodiment 37

The system according to any of Embodiments 35-36,
wherein execution of the instructions by the processor further causes the processor to:
update the information stored in the storage element based on the authorization provided to the transferring entity.

Embodiment 38

The system according to any of Embodiments 35-37,
wherein execution of the instructions by the processor further causes the processor to:
report the authorization provided to the transferring entity to a regulatory entity.

Embodiment 39

The system according to any of Embodiments 35-38,
wherein execution of the instructions by the processor further causes the processor to:
  receive product RFID tag information provided from the transferring entity with the request,
  wherein the product RFID tag information was acquired from a product RFID tag attached to a package product to be transferred to the acquiring entity; and
  report the product RFID tag information to a regulatory entity.

Embodiment 40

The system according to any of Embodiments 37-39, further comprising:
  a plurality of product RFID tags,
  wherein each product RFID tag of the plurality of product RFID tags comprises:
  dynamic data elements,
  wherein the dynamic data elements comprise one or more of the following:
  tag TID value;
  OPC Name;
  OPC License No.;
  Order Date and Day Batch No. for the RFID tag; and
  RFID tag Electronic Product Code (EPC).

Embodiment 41

An RFID tag assembly, comprising:
  a strap, wherein the strap comprises:
  a strap body having a strap body proximal end and a strap body distal end;
  a first strap connecting portion attached to the strap body proximate to the strap body distal end; and
  a second strap connecting portion attached to the strap body proximate to the strap body proximal end,
  wherein the first strap connecting portion and the second strap connecting portion are configured such that when the first strap connecting portion is connected to the second strap connecting portion in a locked position, the first strap connecting portion and second strap connecting portion are in locked connection such that the strap body distal end is in locked connection with the strap body proximal end; and
  an RFID label, wherein the RFID label comprises:
  an RFID label body having an RFID label body proximal end and an RFID label body distal end;
  an RFID circuit, wherein the RFID circuit is attached to the RFID label body;
  an RFID antenna, wherein the RFID antenna is connected to the RFID circuit, wherein the RFID antenna is attached to the RFID label body,
  wherein the RFID label and the strap are configured to:
  (i) interconnect in a first configuration, such that when the first strap connecting portion and the second strap connecting portion are in locked connection, the RFID label does not separate from the strap and an orientation of the RFID label is dependent on an orientation of the strap, and
  (ii) interconnect in a second configuration, such that when the first strap connecting portion and the second strap connecting portion are in locked connection the RFID label does not separate from the strap and the orientation of the RFID label is adjustable independently from the orientation of the strap.

Embodiment 42

The RFID tag assembly according to Embodiment 41,
  wherein when the first strap connecting portion is not connected to the second strap connecting portion, the strap body is in an equilibrium strap position,
  wherein the RFID label and the strap are configured to interconnect in the first configuration, such that when the first strap connecting portion is not connected to the second strap connecting portion in the locked position and the strap body is in the equilibrium strap position, the orientation of the RFID label is dependent on the orientation of the strap.

Embodiment 43

The RFID tag assembly according to any of Embodiments 41-42,
  wherein the first strap connecting portion and the second strap connecting portion are configured such that when the first strap connecting portion and the second strap connecting portion are in locked connection the first strap connecting portion is releasable from the second strap connecting portion.

Embodiment 44

The RFID tag assembly according to any of Embodiments 41-43,
  wherein the first strap connecting portion and second strap connecting portion are configured such that when the first strap connecting portion and second strap connecting portion are in locked connection the first strap connecting portion is releasable from the second strap connecting portion via a tool.

Embodiment 45

The RFID tag assembly according to any of Embodiments 41-43,
  wherein the first strap connecting portion comprises a release mechanism, wherein the first strap connecting portion and second strap connecting portion are configured such that when the first strap connecting portion and second strap connecting portion are in locked connection the first strap connecting portion is releasable from the second strap connecting portion via engagement of the release mechanism.

Embodiment 46

The RFID tag assembly according to any of Embodiments 41-45, wherein the first strap connecting portion is a strap insertion portion and the second strap connecting portion is a strap receiving portion, wherein the strap insertion portion is connected with the strap receiving portion in the locked position when the strap insertion portion is inserted into the strap receiving portion until reaching the locked position.

Embodiment 47

The RFID tag assembly according to any of Embodiments 41-45, wherein the first strap connecting portion is a strap receiving portion and the second strap connecting portion is a strap insertion portion, wherein the strap receiving portion is connected with the strap insertion portion in the locked position when the strap receiving portion is inserted into the strap insertion portion until reaching the locked position.

Embodiment 48

The RFID tag assembly according to any of Embodiments 41-42,
wherein the first strap connecting portion and the second strap connecting portion are configured such that when the first strap connecting portion and the second strap connecting portion are in locked connection a portion of the strap must be removed to unlock the strap.

Embodiment 49

The RFID tag assembly according to Embodiment 48,
wherein the first strap connecting portion or the second strap connecting portion comprise a plurality of knots, wherein the first strap connecting portion and the second strap connecting portion are configured such that when the first strap connecting portion and the second strap connecting portion are in locked connection at least one knot of the plurality of knots must be removed to unlock the strap.

Embodiment 50

The RFID tag assembly according to any of Embodiments 43-47,
wherein the RFID tag assembly can be reused after being released.

Embodiment 51

A method of controlling a transfer of one or more products, comprising:
providing a plurality of RFID buy cards,
wherein each RFID buy card is associated with an acquiring entity of a corresponding plurality of acquiring entities,
wherein each RFID buy card comprises:
a card body;
an RFID circuit, wherein the RFID circuit stores ID information specific to the RFID buy card; and
an RFID antenna,
providing an authorizing stem wherein the authorizing system comprises:
a processor;
a storage element,
wherein the storage element stores information regarding at least one metric with respect to each product of one or more products that are authorized to be transferred to at least one acquiring entity of the plurality of acquiring entities; and
upon the authorizing system receiving from a transferring entity ID information specific to an RFID buy card of the plurality of RFID buy cards and a request for authorization transfer to at least one product of the one or more products to the acquiring entity associated with the RFID buy card that the ID information is specific to, and the authorizing system confirming the requested transfer is within the corresponding at least one metric with respect to the at least one product, providing the transferring entity an authorization via the authorizing system to transfer the at least one product of the one or more products to an acquiring entity of the plurality of acquiring entities associated with the RFID buy card, upon the transferring entity obtaining via an RFID reader the ID information specific to the RFID buy card from the RFID buy card and providing the ID information specific to the RFID buy card to the authorizing system along with a request for authorization transfer to at least one product of the one or more products to the acquiring entity associated with the RFID buy card that the ID information is specific to.

Embodiment 52

The method according to Embodiment 51,
wherein the plurality of acquiring entities is a plurality of persons.

Embodiment 53

The method according to any of Embodiments 51-52,
wherein the transfer is a sale,
wherein the product is a plant based product,
wherein the transferring entity is one of a plurality of transferring entities, wherein the transferring entity provides a transferring ID associated with the transferring entity to the authorizing system with the request for authorization of the sale.

Embodiment 54

The method according to any of Embodiments 51-53,
wherein the ID information comprises biometric data.

Embodiment 55

The method according to any of Embodiments 51-54,
wherein the ID information comprises one or more of the following:
fingerprint and iris scan.

Embodiment 56

The method according to any of Embodiments 51-55,
wherein one or more RFID buy cards of the plurality of RFID buy cards are one or more battery assisted RFID buy cards.

Embodiment 57

The method according to any of Embodiments 51-56,
wherein the one or more RFID buy cards comprise a display, wherein the display displays an amount of a product a corresponding acquiring entity can acquire within a certain time frame.

Embodiment 58

The method according to Embodiment 57,
wherein the display is activated via a button on the RFID buy card.

Embodiment 59

The method according to any of Embodiments 51-58,
wherein the corresponding acquirer enters a password on the RFID card prior to the transfer.

Embodiment 60

The method according to any of Embodiments 51-59,
wherein the one or more RFID buy cards comprise the following:
a memory unit, a clock, a RF communication unit.

Embodiment 61

The method according to Embodiment 1, further comprising:
after the at least one seed or at least one stem matures transfers into a vegetative state to become at least one potted plant, repotting the at least one potted plant.

Embodiment 62

The method according to Embodiment 1, wherein after harvesting and before packaging, further comprising drying and curing the harvested material.

Embodiment 63

The method according to Embodiment 7,
wherein when the first strap connecting portion is not connected to the second strap connecting portion, the strap body is in an equilibrium strap position,
wherein the RFID label and the strap are configured to interconnect in the first configuration, such that when the first strap connecting portion is not connected to the second strap connecting portion in the locked position and the strap body is in the equilibrium strap position, the orientation of the RFID label is dependent on the orientation of the strap.

Embodiment 64

The method according to Embodiment 63,
wherein the first strap connecting portion and the second strap connecting portion are configured such that when the first strap connecting portion and the second strap connecting portion are in locked connection the first strap connecting portion is releasable from the second strap connecting portion.

Embodiment 65

The method according to Embodiment 64,
wherein the first strap connecting portion and second strap connecting portion are configured such that when the first strap connecting portion and second strap connecting portion are in locked connection the first strap connecting portion is releasable from the second strap connecting portion via a tool.

Embodiment 66

The method according to Embodiment 64,
wherein the first strap connecting portion comprises a release mechanism, wherein the first strap connecting portion and second strap connecting portion are configured such that when the first strap connecting portion and second strap connecting portion are in locked connection the first strap connecting portion is releasable from the second strap connecting portion via engagement of the release mechanism.

Embodiment 67

The method according to Embodiment 63, wherein the first strap connecting portion is a strap insertion portion and the second strap connecting portion is a strap receiving portion, wherein the strap insertion portion is connected with the strap receiving portion in the locked position when the strap insertion portion is inserted into the strap receiving portion until reaching the locked position.

Embodiment 68

The method according to Embodiment 63, wherein the first strap connecting portion is a strap receiving portion and the second strap connecting portion is a strap insertion portion, wherein the strap receiving portion is connected with the strap insertion portion in the locked position when the strap receiving portion is inserted into the strap insertion portion until reaching the locked position.

Embodiment 69

The method according to Embodiment 63,
wherein the first strap connecting portion and the second strap connecting portion are configured such that when the first strap connecting portion and the second strap connecting portion are in locked connection a portion of the strap must be removed to unlock the strap.

Embodiment 70

The method according to Embodiment 69,
wherein the first strap connecting portion or the second strap connecting portion comprise a plurality of knots, wherein the first strap connecting portion and the second strap connecting portion are configured such that when the first strap connecting portion and the second strap connecting portion are in locked connection at least one knot of the plurality of knots must be removed to unlock the strap.

Embodiment 71

The method according to Embodiment 64,
wherein the RFID tag assembly can be reused after being released.

Embodiment 72

The method according to Embodiment 7, wherein the RFID circuit and RFID antenna are positioned between layers that are waterproof and UV resistant.

Embodiment 73

The system according to Embodiment 35, wherein the at least one metric comprises an amount of the at least one product.

Embodiment 74

The system according to Embodiment 35, wherein the at least one metric comprises one or more time periods the acquiring entity is allowed to acquire the one or more products.

Embodiment 75

The system according to Embodiment 35, wherein the at least one metric comprises ID information specific to each RFID buy card.

Embodiment 76

The system according to Embodiment 35, wherein the request comprises an amount of the at least one product of the one or more products the transferring entity is requesting authorization to transfer to the acquiring entity.

Aspects of the invention, such as controlling RFID readers, receiving and processing RFID signals, receiving and storing data regarding life cycles of plants, storing data regarding sales and/or distribution of product, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method of tracking at least one plant, comprising:
putting at least one seed or at least one stem in a corresponding at least one pot, wherein each pot of the at least one pot contains soil and/or water;
positioning a corresponding at least one RFID tag with respect to the at least one seed or the at least one stem in a manner that each RFID tag of the at least one RFID tag is associated with the corresponding seed or the corresponding stem;
after the at least one seed or at least one stem matures transfers into a vegetative state to become at least one potted plant, if each RFID tag of the at least one RFID tag is not yet attached to the corresponding potted plant of the at least one potted plant, attaching the each RFID tag of the at least one RFID tag to the corresponding potted plant of the at least one potted plant;
after the at least one potted plant matures further, harvesting the at least one potted plant to create a lot or batch of harvested material;
packaging the harvested material into a packaged product;
attaching either:
  (i) the at least one RFID tag from the at least one potted plant; or
  (ii) a product RFID tag that is associated with the at least one RFID tag,
to the packaged product.

2. The method according to claim 1,
wherein the at least one seed or at least one stem is a plurality of seeds or a plurality of stems, respectively,
wherein the at least one pot is a plurality of pots corresponding to the plurality of seeds or the plurality of stems, respectively, and
wherein the at least one RFID tag is a plurality of RFID tags corresponding to the plurality of seeds or the plurality of stems, respectively.

3. The method according to claim 2,
wherein the plurality of seeds or the plurality of stems comprises at least 10 seeds or at least 10 stems, respectively.

4. The method according to claim 2,
wherein positioning the plurality of RFID tags comprises attaching each RFID tag of the plurality of RFID tags to the corresponding pot of the plurality of pots.

5. The method according to claim 2,
wherein positioning the plurality of RFID tags comprises inserting each RFID tag of the plurality of RFID tags into the soil and/or water of the corresponding pot of the plurality of pots and orienting each RFID tag in a desired orientation.

6. The method according to claim 2,
wherein positioning the plurality of RFID tags comprises attaching each RFID tag of the plurality of RFID tags to the corresponding pot of the plurality of pots or on the corresponding pot of the plurality of pots.

7. The method according to claim 2,
wherein the plurality of RFID tags are incorporated into a corresponding plurality of RFID tag assemblies,
wherein each RFID tag assembly of the plurality of RFID tag assemblies comprises:
a strap, wherein the strap comprises:
  a strap body having a strap body proximal end and a strap body distal end;
  a first strap connecting portion attached to the strap body proximate to the strap body distal end; and
  a second strap connecting portion attached to the strap body proximate to the strap body proximal end,
  wherein the first strap connecting portion and the second strap connecting portion are configured such that when the first strap connecting portion is connected to the second strap connecting portion in a locked position, the first strap connecting portion and second strap connecting portion are in locked connection such that the strap body distal end is in locked connection with the strap body proximal end; and
an RFID label, wherein the RFID label comprises:
  an RFID label body having an RFID label body proximal end and an RFID label body distal end;
  an RFID circuit, wherein the RFID circuit is attached to the RFID label body;
  an RFID antenna, wherein the RFID antenna is connected to the RFID circuit, wherein the RFID antenna is attached to the RFID label body,
  wherein the RFID label and the strap are configured to:
  (i) interconnect in a first configuration, such that when the first strap connecting portion and the second strap connecting portion are in locked connection, the RFID label does not separate from the strap and an orientation of the RFID label is dependent on an orientation of the strap, and
  (ii) interconnect in a second configuration, such that when the first strap connecting portion and the second strap connecting portion are in locked connection the RFID label does not separate from the strap and the orientation of the RFID label is adjustable independently from the orientation of the strap.

8. The method according to claim 7,
wherein when the first strap connecting portion is not connected to the second strap connecting portion, the strap body is in an equilibrium strap position,
wherein positioning the plurality of RFID tags comprises when the strap body of each RFID tag is in the strap body equilibrium position, inserting the strap body of each RFID tag of the plurality of RFID tags into the soil of the corresponding pot of the plurality of pots and orienting each MID tag in the desired orientation.

9. The method according to claim 8,
wherein if the each RFID tag of the plurality of RFID tags is not yet attached to the corresponding potted plant of the plurality of potted plants, attaching the each RFID tag of the plurality of RFID tags to the corresponding potted plant of the plurality of potted plants comprises for each corresponding strap of the corresponding strap assembly, connecting the first strap connecting portion to the second strap connecting portion in the locked position such that in order to remove the RFID strap assembly from the corresponding potted plant, either (i) the strap must be unlocked, or (ii) the potted plant must be damaged.

10. The method according to claim 7,
wherein when the first strap connecting portion is not connected to the second strap connecting portion, the strap body is in an equilibrium strap position,
wherein the RFID label and the strap are configured to interconnect in the first configuration, such that when the first strap connecting portion is not connected to the second strap connecting portion in the locked position and the strap body is in the equilibrium strap position, the orientation of the RFID label is dependent on the orientation of the strap.

11. The method according to claim 10,
wherein the first strap connecting portion and the second strap connecting portion are configured such that when the first strap connecting portion and the second strap connecting portion are in locked connection the first strap connecting portion is releasable from the second strap connecting portion.

12. The method according to claim 11,
wherein the first strap connecting portion and second strap connecting portion are configured such that when the first strap connecting portion and second strap connecting portion are in locked connection the first strap connecting portion is releasable from the second strap connecting portion via a tool.

13. The method according to claim 11,
wherein the first strap connecting portion comprises a release mechanism, wherein the first strap connecting portion and second strap connecting portion are configured such that when the first strap connecting portion and second strap connecting portion are in locked connection the first strap connecting portion is releasable from the second strap connecting portion via engagement of the release mechanism.

14. The method according to claim 11,
wherein the RFID tag assembly can be reused after being released.

15. The method according to claim 10, wherein the first strap connecting portion is a strap insertion portion and the second strap connecting portion is a strap receiving portion, wherein the strap insertion portion is connected with the strap receiving portion in the locked position when the strap insertion portion is inserted into the strap receiving portion until reaching the locked position.

16. The method according to claim 10, wherein the first strap connecting portion is a strap receiving portion and the second strap connecting portion is a strap insertion portion, wherein the strap receiving portion is connected with the strap insertion portion in the locked position when the strap receiving portion is inserted into the strap insertion portion until reaching the locked position.

17. The method according to claim 10,
wherein the first strap connecting portion and the second strap connecting portion are configured such that when the first strap connecting portion and the second strap connecting portion are in locked connection a portion of the strap must be removed to unlock the strap.

18. The method according to claim 17, wherein the first strap connecting portion or the second strap connecting portion comprise a plurality of knots, wherein the first strap connecting portion and the second strap connecting portion are configured such that when the first strap connecting portion and the second strap connecting portion are in locked connection at least one knot of the plurality of knots must be removed to unlock the strap.

19. The method according to claim 7, wherein the RFID circuit and RFID antenna are positioned between layers that are waterproof and UV resistant.

20. The method according to claim 2, further comprising:
associating the plurality of seeds or the plurality of stems with the plurality of RFID tags; and
providing information from the plurality of RFID tags or the product RFID tag attached to the packaged product to a regulatory agency.

21. The method according to claim 2,
wherein the plurality of potted plants are a plurality of potted marijuana plants.

22. The method according to claim 2, wherein each RFID tag of the plurality of RFID tags comprises:
dynamic data elements,
wherein the dynamic data elements comprise one or more of the following:
tag TID value;
OPC Name;
OPC License No.;
Order Date and Day Batch No. for the RFID tag; and
RFID tag Electronic Product Code (EPC).

23. The method according to claim 22, wherein an EPC format of the RFID tag Electronic Product Code is in a form of 24 hex characters, wherein each hex character of the 24 hex characters can have one of 16 values.

24. The method according to claim 23,
wherein the 24 hex characters are formatted as follows: FFF FF FF FFFFFFF FFFFFFFFFF,
wherein each hex character of the 24 hex characters can have a value selected from the following:
0, 1, 2, 3, 4, 5, 6, 7, 8, 9, A, B, C, D, E, and F.

25. The method according to claim 23,
wherein the 24 hex characters are as follows:
a first number of hex characters represent a header;
a second number of hex characters represent an install ID;
a third number of hex characters represent a tag version;
a fourth number of hex characters represent a license no.; and
a fifth number of hex characters represent a serial no.,
wherein the first number plus the second number plus the third number plus the fourth number plus the fifth number equals 24.

26. The method according to claim 25,
wherein the first number is 3, such that the header uses 3 hex characters, wherein the second number is 2, such that the install ID uses 2 hex characters, wherein the third number is 2, such that the tag version uses 2 hex characters, wherein the fourth number is 7, such that the license no. uses 7 hex characters, wherein the fifth number is 10, such that the serial no. uses 10 hex characters.

27. The method according to claim 25,
wherein the header provides a tag identifier of a plurality of tag identifiers, wherein a first tag identifier of the plurality of tag identifiers allows the RFID tag to be filtered immediately.

28. The method according to claim 25,
wherein the tag version defines an Electronic Product Code format for a portion of the Electronic Product Code not including the header and the install ID, such that the tag version is specific to the Install ID,
wherein the tag version is determined based on an Electronic Product Code generator of a plurality of Electronic Product Code generators that generated the Electronic Product Code,
wherein the tag version defines a product type of the RFID tag.

29. The method according to claim 25,
wherein the license no. defines a facility license no. where a product was created.

30. The method according to claim 25,
wherein the install ID identifies an Electronic Product Code generator of a plurality of Electronic Product Code generators, wherein the install ID has a maximum value of FF, wherein a value of the install ID is determined based on the Electronic Product Code generator of the plurality of Electronic Product Code generators that generated the Electronic Product Code.

31. The method according to claim 1, further comprising:
after the at least one seed or at least one stem matures transfers into a vegetative state to become at least one potted plant, repotting the at least one potted plant.

32. The method according to claim 1, wherein after harvesting and before packaging, further comprising drying and curing the harvested material.

33. The method according to claim 1:
wherein each RFID tag of the at least one RFID tag comprises:
dynamic data elements,
wherein the dynamic data elements comprise one or more of the following:
tag TID value;
OPC Name;
OPC License No.;
Order Date and Day Batch No. for the RFID tag; and
RFID tag Electronic Product Code (EPC).

34. The method according to claim 1,
wherein the method comprises:
attaching:
(i) the at least one RFID tag from the at least one potted plant to the packaged product.

35. The method according to claim 1,
wherein the method comprises:
attaching:
(ii) a product RFID tag that is associated with the at least one tag to the packaged product.

* * * * *

UNITED STATES PATENT AND TRADEMARK OFFICE
CERTIFICATE OF CORRECTION

PATENT NO. : 10,474,854 B2
APPLICATION NO. : 15/655285
DATED : November 12, 2019
INVENTOR(S) : Dagdelen Uysal et al.

Page 1 of 1

It is certified that error appears in the above-identified patent and that said Letters Patent is hereby corrected as shown below:

In the Specification

Column 3,
Line 47, "seller can seller" should read -- seller can sell --.

Column 4,
Line 55, "at least couple of" should read -- at least a couple of --.

Column 7,
Line 27, "it can advantageous" should read -- it can be advantageous --.

Column 7,
Line 43, "are feed continuously" should read -- are fed continuously --.

Column 7,
Line 64, "30', 45', 60', 90'," should read -- 30°, 45°, 60°, 90° --.

Column 8,
Line 4, "cannot not be" should read -- cannot be --.

Column 14,
Line 26, "process" should read -- processes --.

Column 25,
Line 30, "Metro" should read -- Metre --.

Signed and Sealed this
Third Day of November, 2020

Andrei Iancu
*Director of the United States Patent and Trademark Office*